United States Patent
Xin et al.

(10) Patent No.: US 8,699,712 B2
(45) Date of Patent: Apr. 15, 2014

(54) RANDOMIZATION OF PLAIN TEXT FOR GSM SACCH

(75) Inventors: Yan Xin, Kanata (CA); Huan Wu, Ottawa (CA); Raveendra Seetharam, Kitchener (CA)

(73) Assignee: BlackBerry Limited, Waterloo (CA)

( * ) Notice: Subject to any disclaimer, the term of this patent is extended or adjusted under 35 U.S.C. 154(b) by 108 days.

(21) Appl. No.: 13/225,116

(22) Filed: Sep. 2, 2011

(65) Prior Publication Data

US 2013/0058485 A1    Mar. 7, 2013

(51) Int. Cl.
*H04W 12/00* (2009.01)
*H04L 12/66* (2006.01)
*H04J 3/12* (2006.01)
*H04B 17/00* (2006.01)
*H04B 7/26* (2006.01)

(52) U.S. Cl.
USPC ............... 380/270; 380/46; 370/463; 341/81; 455/422.1; 455/466

(58) Field of Classification Search
USPC ............ 380/270, 46; 455/422.1, 466; 341/81; 370/463
See application file for complete search history.

(56) References Cited

U.S. PATENT DOCUMENTS

| | | | |
|---|---|---|---|
| 5,091,942 A | 2/1992 | Dent | |
| 6,498,936 B1 | 12/2002 | Raith | |
| 7,280,556 B2 | 10/2007 | Redondo et al. | |
| 2005/0110663 A1* | 5/2005 | O'Shea et al. | 341/81 |
| 2012/0220287 A1* | 8/2012 | Hole et al. | 455/422.1 |

FOREIGN PATENT DOCUMENTS

WO    WO 9621998 A2 *   7/1996

OTHER PUBLICATIONS

Busschaert, H.J.; Reusens, P.P.; Van Wauwe, G.; De Langhe, M.; Van Camp, R.M.A.; Gouwy, C.M.W.; Dartois, L.; "A power-efficient channel coder/decoder chip for GSM terminals"; Solid-State Circuits, IEEE Journal of Volume: 27, Issue: 3 Digital Object Identifier: 10.1109/4.121552; Publication Year: Mar. 1992, pp. 307-313.*
International Searching Authority, "International Search Report and Written Opinion", issued in connection with international application No. PCT/CA2012/050580, Dated Nov. 9, 2012, 7 pages.

* cited by examiner

*Primary Examiner* — Nirav B Patel
*Assistant Examiner* — Courtney Fields
(74) *Attorney, Agent, or Firm* — Hanley, Flight & Zimmerman LLC

(57) ABSTRACT

The present document relates to the transmission of data in a digital cellular telecommunications network. In particular, the present document relates to the secure transmission of data over Global System for Mobile Communications (GSM) networks. A method for encoding a SACCH information block in a wireless network is described. The method comprises randomizing a plurality of randomization unit input bits derived from at least some of a plurality of payload bits of the SACCH information block using a pseudo-random bit block, thereby yielding a plurality of randomized bits; and ciphering a plurality of ciphering unit input bits derived from at least some of the plurality of randomized bits, thereby yielding an encoded data burst of a SACCH frame; wherein ciphering is based on a ciphering algorithm using a ciphering key Kc and a frame number COUNT of the SACCH frame; wherein the pseudo-random bit block is determined based on the ciphering key Kc.

18 Claims, 16 Drawing Sheets

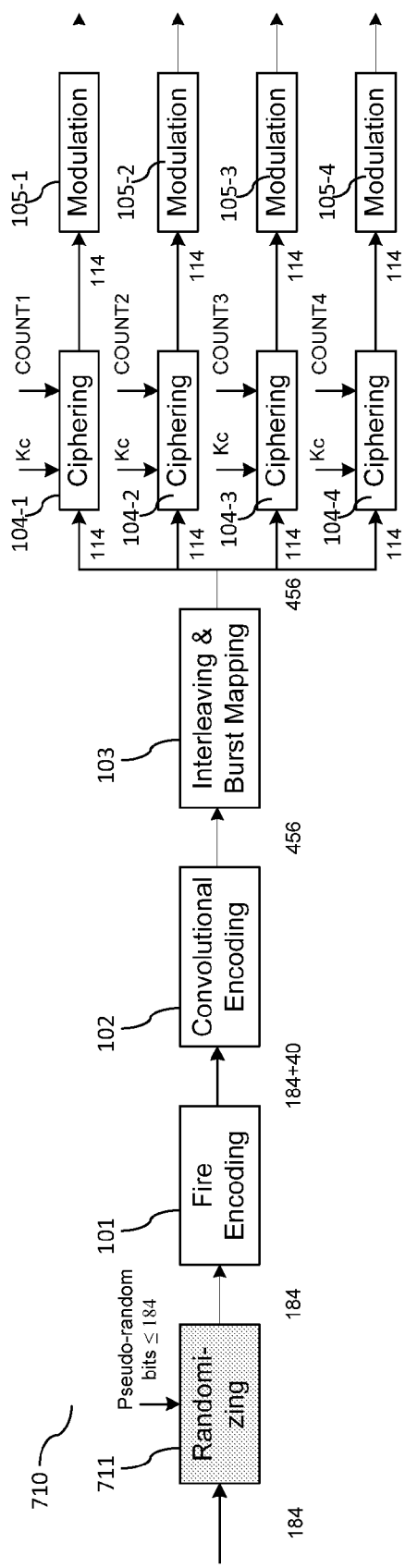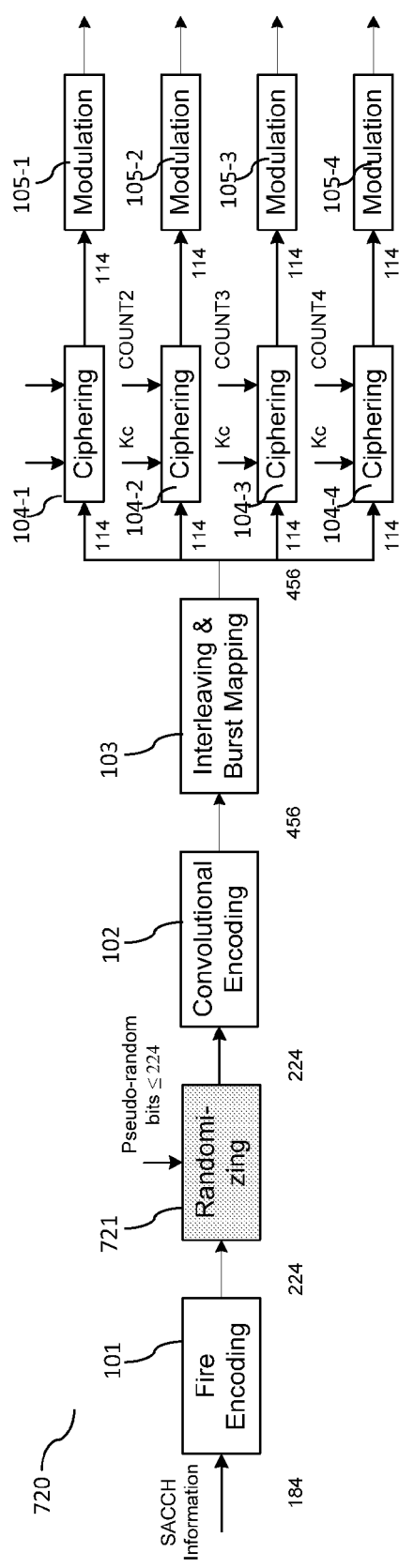
Fig. 7 (a)
FIG. 7 (b)

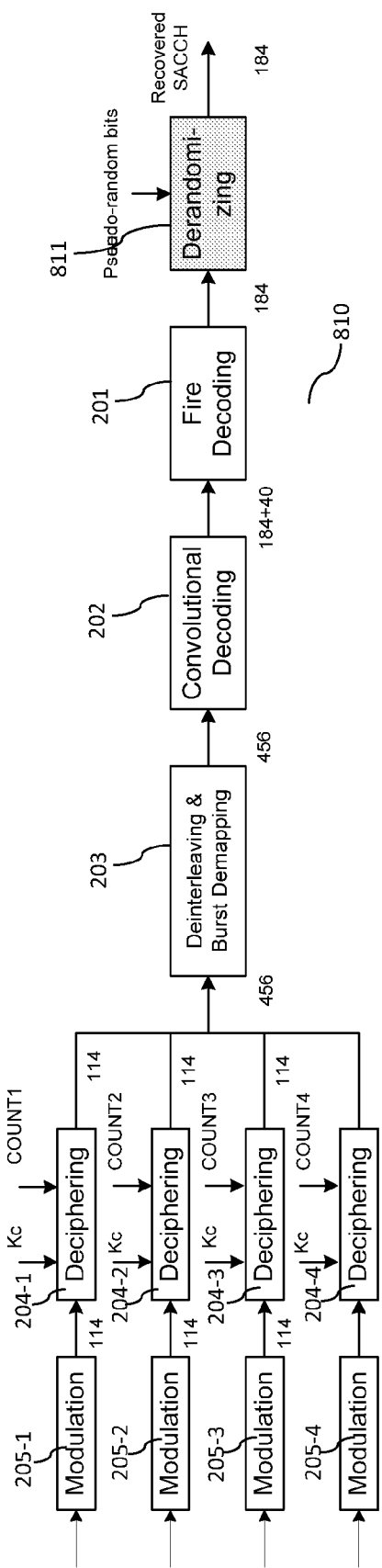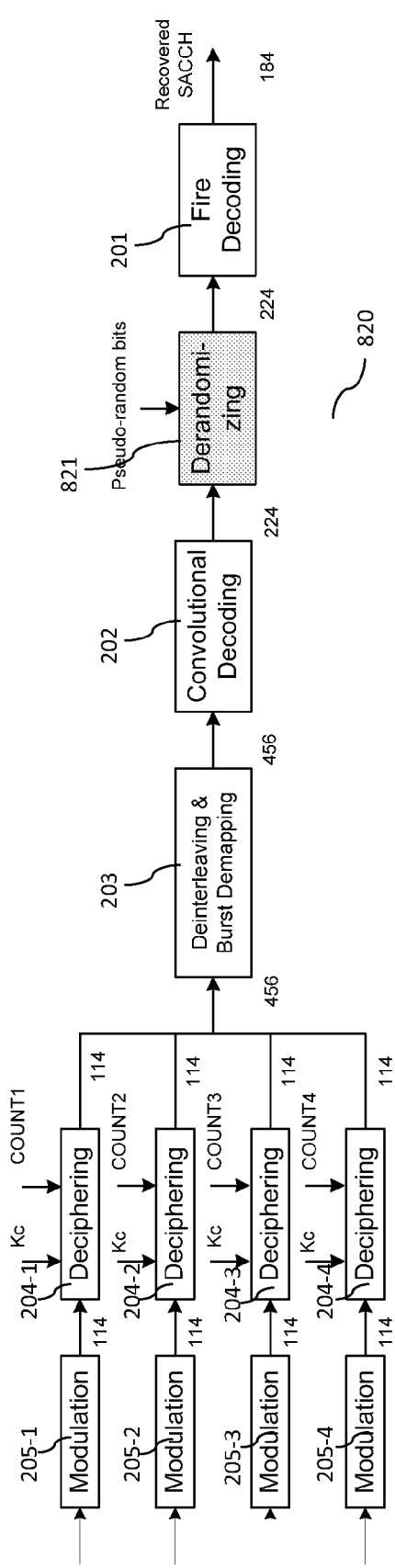
Fig. 8 (a)
Fig. 8 (b)

US 8,699,712 B2

RANDOMIZATION OF PLAIN TEXT FOR GSM SACCH

TECHNICAL FIELD

The present document relates to the transmission of data in a digital cellular telecommunications network. In particular, the present document relates to the secure transmission of data over Global System for Mobile Communications (GSM) networks.

BACKGROUND

Recently there have been increased concerns on the security of Global System for Mobile Communications (GSM) networks using the A5 ciphering algorithm, in particular the A5/1 ciphering algorithm.

SHORT DESCRIPTION OF THE FIGURES

Various aspects are explained below in an exemplary manner with reference to the accompanying drawings, wherein FIG. 1 illustrates an example block diagram of a SACCH encoding chain (including the respective number of bits of SACCH data);

Figure 9:
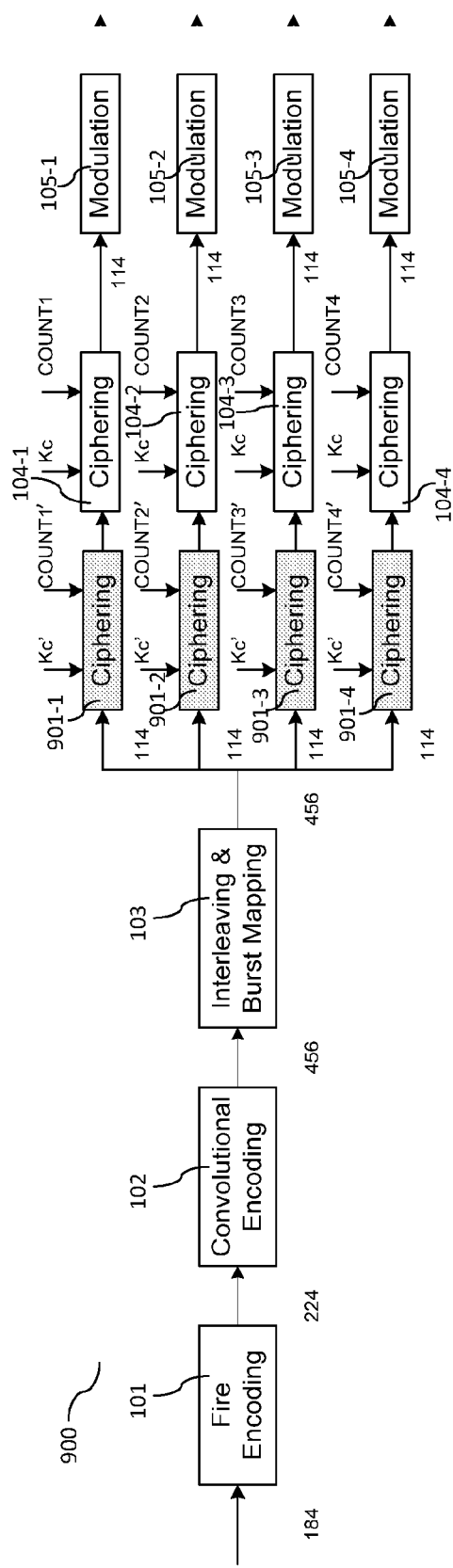
Figure 10:
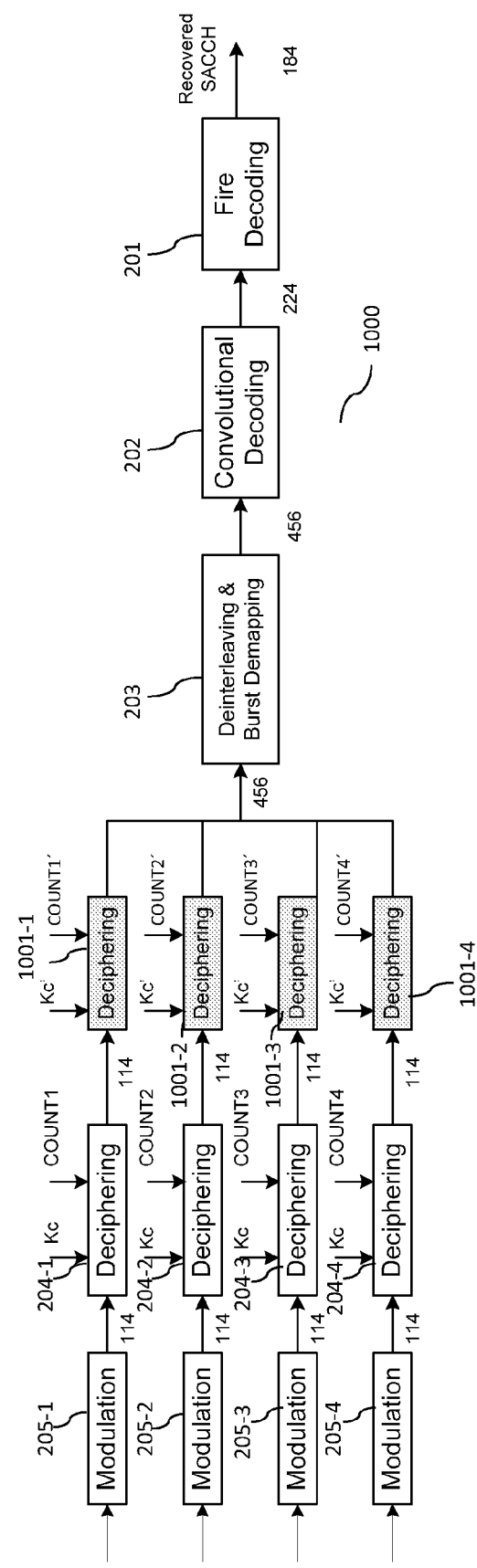
Figure 11:
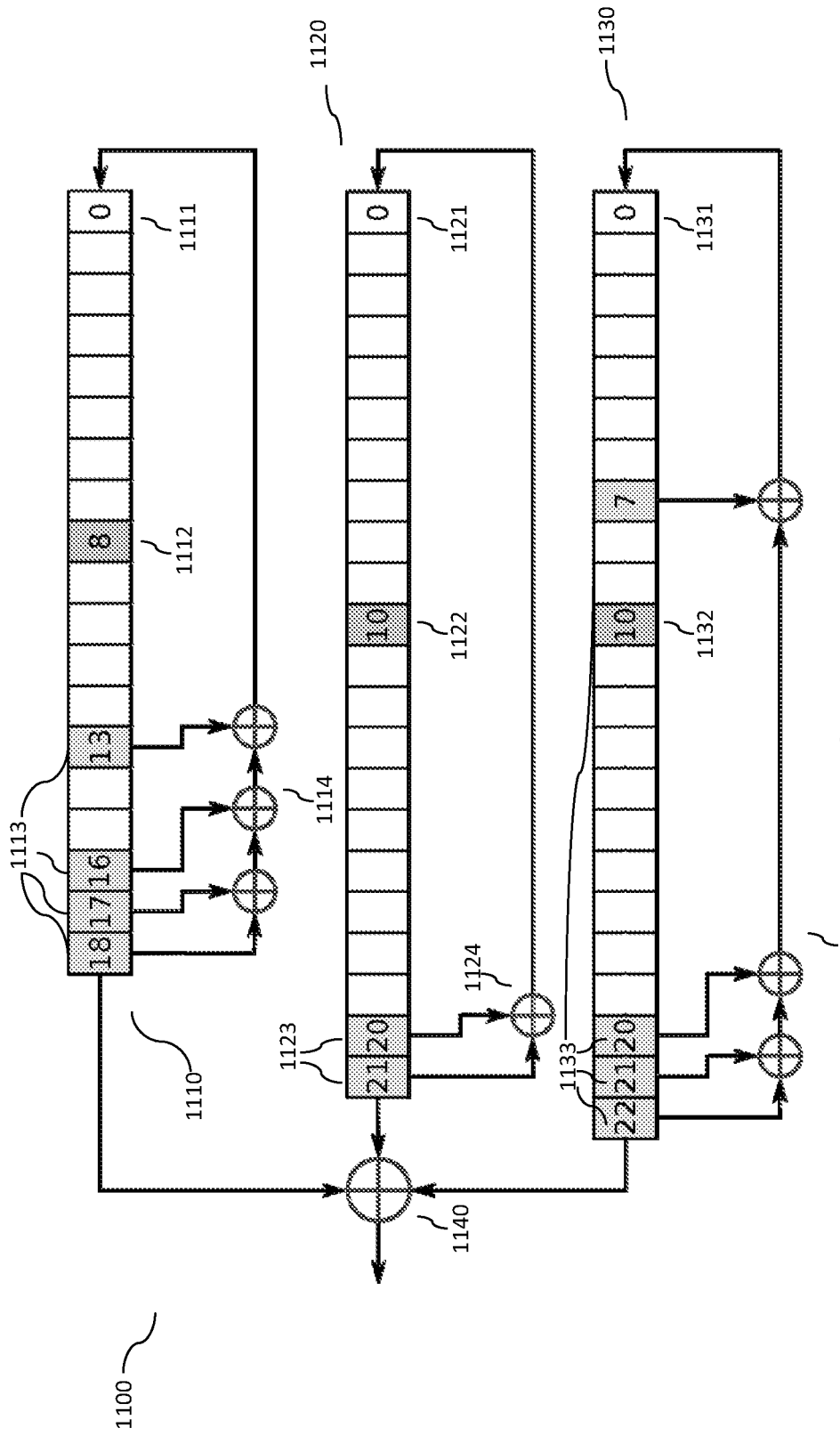
Figure 12:
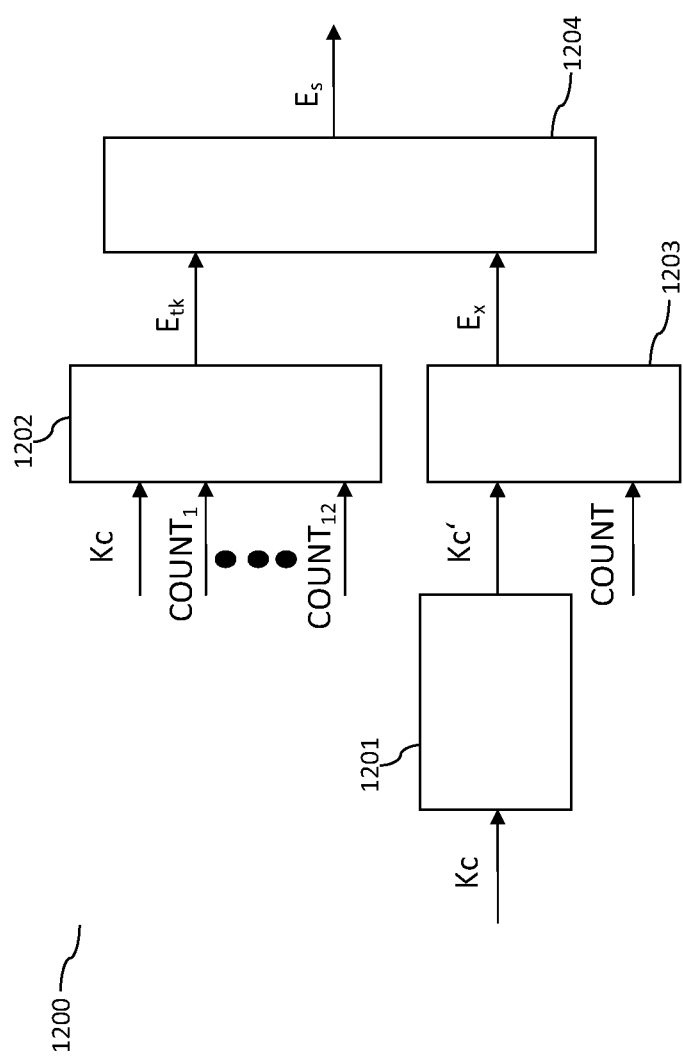
Figure 13:
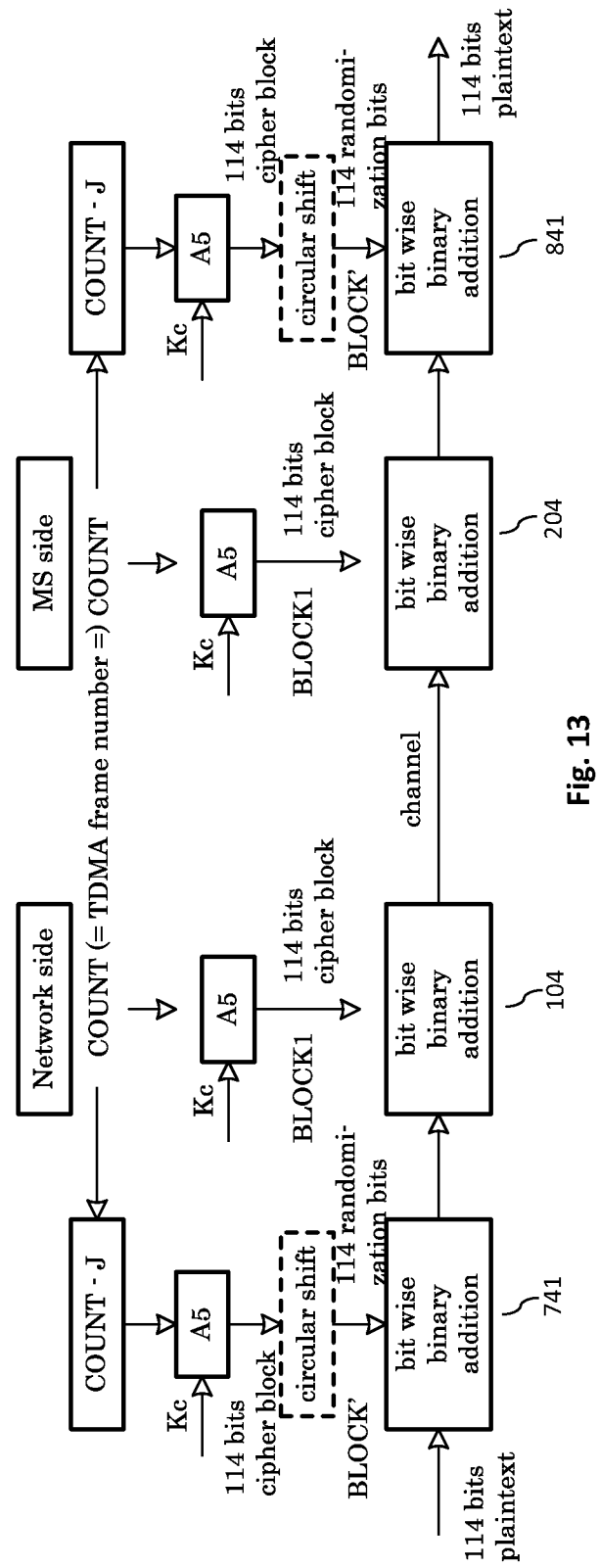
Figure 14:
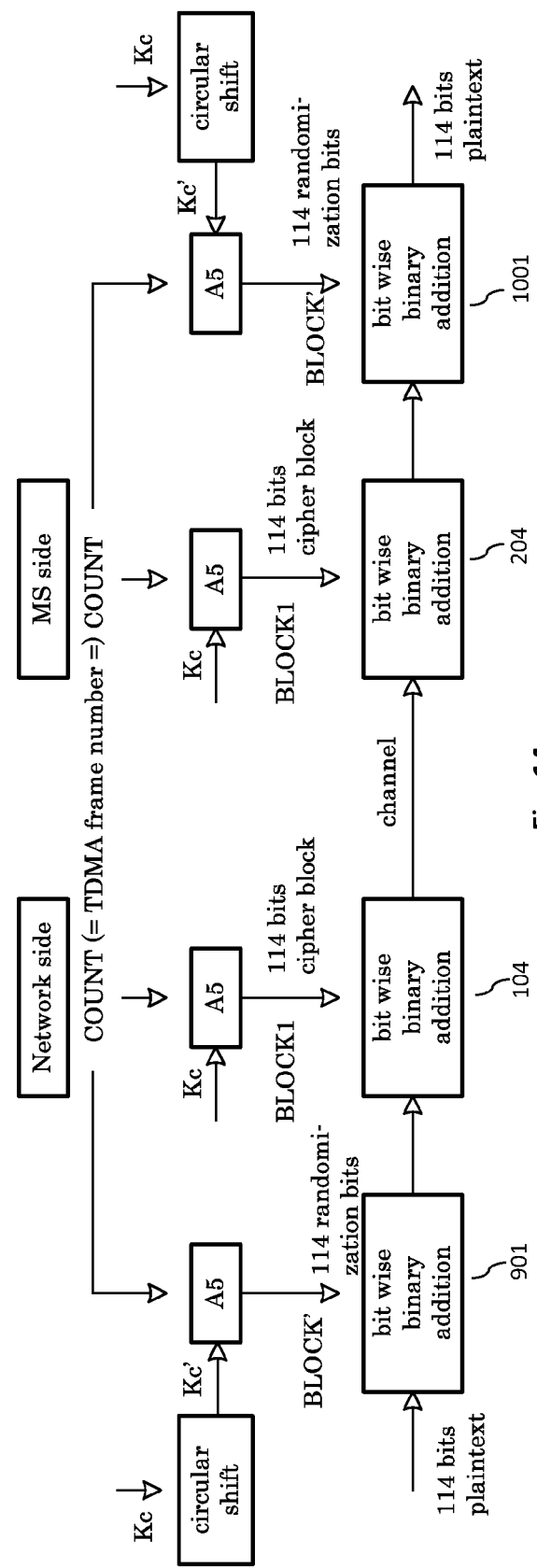

FIGS. 7a, b, c, d illustrate example block diagrams of randomization of SACCH data at a transmitter (including the respective number of bits of SACCH data);

FIGS. 8a, b, c, d illustrate example block diagrams of the recovery of SACCH information at a receiver (wherein the SACCH data has been randomized in accordance to FIGS. 7a, b, c, d) (including the respective number of bits of SACCH data);

FIG. 9 illustrates an example block diagram of double ciphering at a transmitter (including the respective number of bits of SACCH data);

FIG. 10 illustrates an example block diagram of the recovery of SACCH information at a receiver (double ciphering) (including the respective number of bits of SACCH data);

FIG. 11 illustrates an example implementation of an A5/1 ciphering algorithm for generating a cipher block;

FIG. 12 illustrates an example block diagram of a method for determining the pseudo-random bit block;

FIG. 13 shows an example implementation of the randomization/de-randomization method as may be specified in 3GPP TS 43.020; and FIG. 14 shows another example implementation of the randomization/de-randomization method as may be specified in 3GPP TS 43.020.

DETAILED DESCRIPTION

The present document disclosure discusses how the methods relating to the "randomization of plaintext" can help enhance the security of data transmission in GSM networks. In particular, the security of the GSM Slow Associated Control Channel (SACCH) can be enhanced in order to help better protect Traffic Channels (TCH) which may use the same security key as used in SACCH in the wireless networks.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

According to an aspect, a method for encoding a SACCH information block, wherein the SACCH information block may comprise a plurality of payload bits, in a wireless network, e.g. a GSM network, is described. The method may be directed at encoding a SACCH information block on the downlink (DL) from the GSM network to a mobile station (MS). The method comprises randomizing a plurality of Randomization Unit Input (R-INPUT) bits derived from (at least some or all of) the plurality of payload bits of the SACCH information block using a pseudo-random bit block, thereby yielding a plurality of randomized bits. In other words, one or more bits which have been obtained from the payload bits of the SACCH information block are randomized. The plurality of R-INPUT bits may be the plurality of bits at the input of the randomization unit 711, 721, 731, 741, 901 of FIGS. 7a, b, c, d and FIG. 9, respectively. The randomization may make use of a pseudo-random bit block. The pseudo-random bit block may be derived from one or more different cipher blocks generated by the A5/1 ciphering algorithm. The length of the pseudo-random bit block may correspond to the number of bits which are to be randomized. The randomization of the plurality of R-INPUT bits using the pseudo-random bit block may comprise performing a bitwise modulo-2 addition of the plurality of R-INPUT bits and the pseudo-random bit block.

The plurality of R-INPUT bits which are to be randomized may be some or all of the plurality of payload bits of the SACCH information block (see e.g. FIG. 7a). Typically, a SACCH information block comprises 184 payload bits which are transmitted within a group of four SACCH frames. These 184 SACCH information bits are referred to as the plurality of payload bits of the SACCH information block. Alternatively or in addition, the plurality of R-INPUT bits which are to be randomized may be some or all of a plurality of fire encoded bits (see e.g. FIG. 7b). The plurality of fire encoded bits may be determined by fire encoding the plurality of payload bits of the SACCH information block. The fire encoding may be based on a cyclic redundancy check. Typically, the plurality of fire encoded bits comprises 224 bits which are transmitted within four data bursts of corresponding four SACCH frames. Alternatively or in addition, the plurality of R-INPUT bits which are to be randomized may be some or all of a plurality of convolutional encoded bits (see e.g. FIG. 7c). The plurality of convolutional encoded bits may be determined by submitting the plurality of fire encoded bits to a convolutional encoder. Typically, the plurality of convolutional encoded bits comprises 456 bits which are transmitted within four SACCH frames. Alternatively or in addition, the plurality of R-INPUT bits which are to be randomized may be some or all of a plurality of plaintext bits (i.e., data before ciphering) in a data burst (see e.g. FIG. 7d). The plurality of plaintext bits in a data burst may be determined by mapping a subset of the plurality of convolutional encoded bits to the data burst. The subset of the plurality of convolutional encoded bits may be determined by interleaving the plurality of convolutional encoded bits. Typically, the plurality of convolutional encoded bits is split up into four interleaved subsets, each subset forming a data burst. The plurality of plaintext bits of one data burst then comprises 114 bits.

As such, in all the embodiments shown in FIGS. 7*a, b, c* and *d* and FIG. 9, the plurality of R-INPUT bits is determined using some or all of the plurality of payload bits of the SACCH information block. The plurality of R-INPUT bits may be determined by directly selecting some or all of the plurality of payload bits of the SACCH information block (as shown in FIG. 7*a*), or the plurality of R-INPUT bits may be selected from some or all of a plurality of bits which has been obtained by processing the plurality of payload bits of the SACCH information block (as shown in FIGS. 7*b, c, d* and FIG. 9). The processing may comprise fire encoding, convolutional encoding and/or interleaving/burst mapping.

The method may further comprise ciphering a plurality of Ciphering Unit Input (C-INPUT) bits derived from (at least some or all of) the plurality of randomized bits, thereby yielding an encoded data burst of a SACCH frame. The plurality of C-INPUT bits may be the plurality of bits at the input of the ciphering units 104 shown e.g. in FIGS. 7*a, b, c, d* and FIG. 9, respectively. If the plurality of randomized bits has been determined by randomizing the plurality of plaintext bits in a data burst, the plurality of C-INPUT bits may correspond to the plurality of randomized bits. If the plurality of randomized bits has been determined by randomizing the plurality of convolutional encoded bits, the plurality of C-INPUT bits may be derived from the plurality of randomized bits by submitting the plurality of randomized bits to interleaving and mapping. If the plurality of randomized bits has been determined by randomizing the plurality of fire encoded bits, the plurality of C-INPUT bits may be derived from (at least some or all of) the plurality of randomized bits by submitting the plurality of randomized bits to convolutional encoding followed by interleaving and mapping. If the plurality of randomized bits has been determined by randomizing the plurality of payload bits of the SACCH information block, the plurality of C-INPUT bits may be derived from the plurality of randomized bits by submitting the plurality of randomized bits to fire encoding, followed by convolutional encoding and followed by interleaving and mapping.

As such, in all the embodiment of FIGS. 7*a, b, c* and *d* and FIG. 9 the plurality of C-INPUT bits is determined from at least some of the plurality of randomized bits, i.e. the plurality of bits at the output of the randomization unit. Depending on the embodiment, the plurality of C-INPUT bits may be selected directly from the plurality of randomized bits (FIG. 7*d* and FIG. 9), or the plurality of C-INPUT bits may be selected from a plurality of bits obtained by processing some or all of the plurality of randomized bits (FIGS. 7*a, b, c*). The processing may comprise fire encoding, convolutional encoding and/or interleaving/burst mapping.

Typically, the ciphering is based on a ciphering algorithm, e.g. an A5 ciphering algorithm, using a ciphering key Kc and a frame number COUNT of the SACCH frame. In particular, the ciphering may make use of the A5/1 ciphering algorithm, wherein the ciphering key Kc and the frame number COUNT of the SACCH frame may be used to initialize the A5/1 ciphering algorithm.

The pseudo-random bit block may be determined based on or using or depending on or by taking into account the ciphering key Kc. In general terms, the pseudo-random bit block may be determined based on or using information which is known by both transmitter and the corresponding receiver. It is desirable that such information be available at a transmitter and a corresponding receiver within the GSM network (without the need for transmitting additional overhead information). This means that the pseudo-random bit block may be determined based on or using information which is common to the transmitter and the receiver. As such, the pseudo-random bit block may be determined independently at the transmitter, as well as at the receiver. When transmitting a SACCH frame on the downlink (DL) from the network/base station to a mobile station (MS), the transmitter may be positioned within the network/base station and the receiver may be positioned within the mobile station.

The pseudo-random bit block may be determined from the information available at the transmitter (and the corresponding receiver) using a pre-determined function. The pre-determined function may be a non-linear function, thereby increasing the computational complexity of a cipher attack. Alternatively or in addition, the pre-determined function may be kept secret, thereby preventing any possibilities for a known-plaintext attack.

The available information which is used to determine the pseudo-random bit block may comprise data which has been exchanged between the transmitter and the receiver during previous transmissions of data bursts. The available information which is used to determine the pseudo-random bit block may comprise data which has been used to encode data bursts for previous transmissions of data bursts. By way of example, the available information used for determining the pseudo-random bit block may be a second frame number which is different from the frame number COUNT of the SACCH frame. The second frame number may be a frame number of a TCH frame preceding the SACCH frame. In an example, one or more A5 cipher blocks (e.g. A5/1 cipher blocks) used to cipher one or more data bursts of corresponding TCH frames preceding the SACCH frame may be used to determine the pseudo-random bit block. The pseudo-random bit block may be determined as a (non-linear) function of the one or more A5 cipher blocks. In particular, the pseudo-random bit block may be determined by combining a plurality of cipher blocks using a (non-linear) mathematical function. Alternatively or in addition, the pseudo-random bit block may be determined by interleaving or transposing the bits of the one or more cipher blocks. Alternatively or in addition, the pseudo-random bit block may be determined by circular shifting the bits of the one or more cipher blocks. Alternatively or in addition, the pseudo-random bit block may be determined by any other processes of one or more cipher blocks.

In a further example (which may be combined with the above mentioned examples), a modified ciphering key Kc' may be determined from the ciphering key Kc using a (pre-determined) modification function. In other words, the available information may be the ciphering key Kc and the modification function. The modification function may be a non-linear function, thereby increasing the complexity of a cipher attack. Alternatively or in addition, the modification function may be kept secret, thereby preventing any possibilities for a known-plaintext attack. The modification function may comprise one or more of interleaving of bits comprised in the ciphering key Kc, transposing of bits comprised in the ciphering key Kc, and/or circular shifting of the bits comprised in the ciphering key Kc. Alternatively or in addition, the modification function may comprise any other modifications of Kc.

The pseudo-random bit block may be determined using the modified ciphering key Kc'. In particular, the pseudo-random bit block may be determined using the A5 ciphering algorithm (e.g. the A5/1 ciphering algorithm) and the modified ciphering key Kc'. Furthermore, the frame number COUNT of the SACCH frame may be used.

Furthermore, the method for encoding a SACCH information block may comprise
- fire encoding the plurality of payload bits of the SACCH information block or the plurality of randomized bits, if some or all of the plurality of payload bits of the SACCH information block have been randomized; and/or
- convolutional encoding the plurality of fire encoded bits or the plurality of randomized bits, if some or all of the plurality of fire encoded bits have been randomized; and/or
- interleaving and mapping the plurality of convolutional encoded bits or the plurality of randomized bits, if some or all of the plurality of convolutional encoded bits have been randomized.

According to a further aspect, a method for decoding a SACCH information block, wherein the SACCH information block may comprise a plurality of payload bits, in a wireless network, e.g. a GSM network, from an encoded data burst of a SACCH frame is described. The method may be directed at a SACCH information block which is transmitted on the downlink (DL) from the GSM network to a mobile station (MS). The method may comprise deciphering a plurality of bits comprised within the encoded data burst of the SACCH frame, thereby yielding a plurality of recovered plaintext bits of a data burst. The deciphering may be based on a ciphering algorithm, e.g. an A5 ciphering algorithm (e.g. an A5/1 ciphering algorithm), using a ciphering key Kc and a frame number COUNT of the SACCH frame.

Furthermore, the method may comprise de-randomizing a plurality of De-Randomization Unit Input (D-INPUT) bits derived from (at least some or all of) the plurality of recovered plaintext bits of the data burst using a pseudo-random bit block, thereby yielding a plurality of recovered R-INPUT bits. The plurality of D-INPUT bits may be the plurality of bits at the input of the de-randomization unit 811, 821, 831, 841, 1001 shown in FIGS. 8*a, b, c, d* and FIG. 10, respectively. The plurality of D-INPUT bits may be some or all of the plurality of recovered plaintext bits of the data burst. Alternatively or in addition, the plurality of D-INPUT bits may be some or all of a plurality of recovered convolutional encoded bits. The plurality of recovered convolutional encoded bits may be determined by combining the plurality of recovered plaintext bits of a plurality of data bursts. Typically, four data bursts are combined to determine the plurality of recovered convolutional encoded bits. Alternatively or in addition, the plurality of D-INPUT bits may be some or all of a plurality of recovered fire encoded bits. The plurality of recovered fire encoded bits may be determined by submitting the plurality of recovered convolutional encoded bits to a convolutional decoder. Alternatively or in addition, the plurality of D-INPUT bits may be some or all of the plurality of recovered payload bits of the SACCH information block. The plurality of recovered payload bits may be determined by submitting the plurality of recovered fire encoded bits to a fire decoder.

As such, in all the embodiments shown in FIGS. 8*a, b, c* and *d* and FIG. 10 the plurality of D-INPUT bits is determined from at least some of the plurality of recovered plaintext bits (i.e. the plurality of bits at the output of the de-ciphering unit). The plurality of D-INPUT bits may be selected directly from some or all of the plurality of recovered plaintext bits (as shown in FIG. 8*d* and FIG. 10), or the plurality of D-INPUT bits may be selected from a plurality of bits obtained by processing of the plurality of recovered plaintext bits (as shown in FIGS. 8*a, b, c*). The processing may comprise de-interleaving & burst demapping, convolutional decoding and/or fire decoding.

Eventually, the plurality of recovered payload bits of the SACCH information block may be determined from the output of de-randomization unit, i.e. from the plurality of recovered R-INPUT bits. Depending on the embodiment, the plurality of recovered payload bits of the SACCH information block may be selected directly from the plurality of recovered R-INPUT bits (FIG. 8*a*), or the plurality of recovered payload bits of the SACCH information block may be selected from a plurality of bits obtained by processing of the plurality of recovered R-INPUT bits (FIGS. 8*b, c, d* and FIG. 10). The processing may comprise de-interleaving & burst demapping, convolutional decoding and/or fire decoding.

In a corresponding manner to the randomization within the encoding method, the de-randomization of the plurality of D-INPUT bits using the pseudo-random bit block may comprise performing a bitwise modulo-2 addition of the plurality of D-INPUT bits and the pseudo-random bit block.

The pseudo-random bit block for de-randomization may be determined based on the ciphering key Kc and/or other parameters. In particular, the pseudo-random bit block is typically determined based on or using information which is known by both transmitter and the corresponding receiver. It is desirable that such information be already available at a transmitter and the corresponding receiver (without the need of transmitting additional overhead information). Examples for determining the pseudo-random bit block have been outlined in the context of the corresponding method for encoding a SACCH information block and are equally applicable to the method for decoding a SACCH information block.

Furthermore, the decoding method may comprise
- de-interleaving and de-mapping of the (possibly de-randomized) plurality of recovered plaintext bits of a plurality of data bursts; and/or
- convolutional decoding of the plurality of (possibly de-randomized) recovered convolutional encoded bits; and/or
- fire decoding of the plurality of (possibly de-randomized) recovered fire encoded bits.

According to a further aspect, an encoder configured to encode a SACCH information block, wherein the SACCH information block may comprise a plurality of payload bits, in a wireless network, e.g. a GSM network, is described. The encoder may comprise a randomization unit configured to randomize a plurality of R-INPUT bits derived from (at least some or all of) the plurality of payload bits of the SACCH information block using a pseudo-random bit block, thereby yielding a plurality of randomized bits. Furthermore, the encoder may comprise a ciphering unit configured to cipher a plurality of C-INPUT bits derived from (at least some or all of) the plurality of randomized bits, thereby yielding an encoded data burst of a SACCH frame. The ciphering may be based on an A5 ciphering algorithm using a ciphering key Kc and a frame number COUNT of the SACCH frame. The pseudo-random bit block may be determined based on the same ciphering key Kc.

According to another aspect, a decoder configured to decode a SACCH information block, wherein the SACCH information block may comprise a plurality of payload bits, in a wireless network, e.g. a GSM network, from an encoded data burst of a SACCH frame is described. The decoder may comprise a deciphering unit configured to decipher a plurality of bits comprised within the encoded data burst of the SACCH frame, thereby yielding a plurality of recovered plaintext bits of a data burst. The deciphering may be based on an A5 ciphering algorithm using a ciphering key Kc and a frame number COUNT of the SACCH frame. Furthermore, the decoder may comprise a de-randomization unit configured to de-randomize a plurality of D-INPUT bits derived from (at least some or all of) the plurality of recovered plaintext bits of the data burst using a pseudo-random bit block. The pseudo-random bit block may be determined based on the same ciphering key Kc.

According to another aspect, an encoded data burst of a SACCH frame in a GSM network is described. The encoded data burst may have been generated using any of the encoding method steps outlined in the present document.

According to a further aspect, a software program is described. The software program may be stored on a computer-readable medium (which may be tangible or otherwise non-transitory) as instructions that are adapted for execution on a processor and for performing the aspects and features outlined in the present document when carried out on a computing device.

According to another aspect, a storage medium comprising a software program is described. The storage medium may be memory (e.g. RAM, ROM, etc.), optical media, magnetic media and the like. The software program may be adapted for execution on a processor and for performing the aspects and features outlined in the present document when carried out on a computing device.

According to a further aspect, a computer program product is described. The computer program product may comprise executable instructions for performing the aspects and features outlined in the present document when executed on a computing device.

According to another aspect, a non-transitory computer-readable medium encoded with instructions capable of being executed by a computer is described. The execution of the instructions capable of being executed by a computer may be for randomizing a plurality of randomization unit input, R-INPUT, bits derived from (at least some or all of) a plurality of payload bits of a SACCH information block using a pseudo-random bit block, thereby yielding a plurality of randomized bits; and/or for ciphering a plurality of ciphering unit input, C-INPUT, bits derived from (at least some or all of) the plurality of randomized bits, thereby yielding an encoded data burst of a SACCH frame; wherein ciphering is based on a ciphering algorithm using a ciphering key Kc and a frame number COUNT of the SACCH frame; wherein the pseudo-random bit block is determined based on the ciphering key Kc.

According to a further aspect, a non-transitory computer-readable medium encoded with instructions capable of being executed by a computer is described. The execution of the instructions capable of being executed by a computer may be for deciphering a plurality of bits comprised within an encoded data burst of a SACCH frame, thereby yielding a plurality of recovered plaintext bits of a data burst; wherein deciphering is based on a ciphering algorithm using a ciphering key Kc and a frame number COUNT of the SACCH frame; and/or for de-randomizing a plurality of de-randomization unit input, D-INPUT, bits derived from (at least some or all of) the plurality of plaintext bits of the data burst using a pseudo-random bit block; wherein the pseudo-random bit block is determined based on the ciphering key Kc.

A5 is a ciphering algorithm which is widely used in the GSM standard to provide the protection for both, user data and signalling information, at the physical layer on the traffic channel (TCH) (including on its associated control channels, FACCH (Fast associated control channel) and SACCH) or the dedicated control channel (DCCH). As specified in 3GPP TS 43.020, (Security related network functions) which is incorporated by reference, A5 has multiple versions such as A5/1, A5/2, A5/3, and A5/4, etc. Typically, it is mandatory for the non-encrypted mode that A5/1 and (from Release 6 onwards) A5/3 is implemented in mobile stations (MS).

Several attacks against A5/1 ciphering have been observed and potential security risks to the GSM networks due to the weakness of A5/1 ciphering have been highlighted. The methods and systems described in the present document address these issues. It should be noted that—even though the methods and systems described in the present document are outlined in the context of A5/1 ciphering—they are also applicable to other A5 ciphering algorithms and ciphering algorithms in general.

In GSM, System Information Type 2 (SI2) is typically transmitted on the broadcast channel (BCCH), which is not ciphered, while System Information Type 5 (SI5) is typically transmitted on the SACCH in the downlink, which is usually ciphered. Both SI2 and SI5 usually deliver the same Neighbour Cell Description IE in the downlink towards the MS. As such, the same information is transmitted in a plaintext and in a ciphertext format, thereby enabling the use of so called known-plaintext attacks. A similar weakness can exist with other system information messages, such as System Information Type 2bis, 2ter which are broadcast on BCCH and System Information Type 5bis, 5ter sent on SACCH. Therefore, an attacker can take an advantage of this observation in GSM by comparing the known text before (plaintext) and after (ciphertext) ciphering in a SACCH burst. As a result from the comparing, deciphering on the A5/1 algorithm may be conducted to determine the ciphering key Kc. Once the ciphering key Kc is known, the ciphering key Kc can be used to decrypt other ciphered information (e.g. voice data sent on the TCH) which is sent using the same ciphering algorithm and the same ciphering key Kc.

Figure 1:
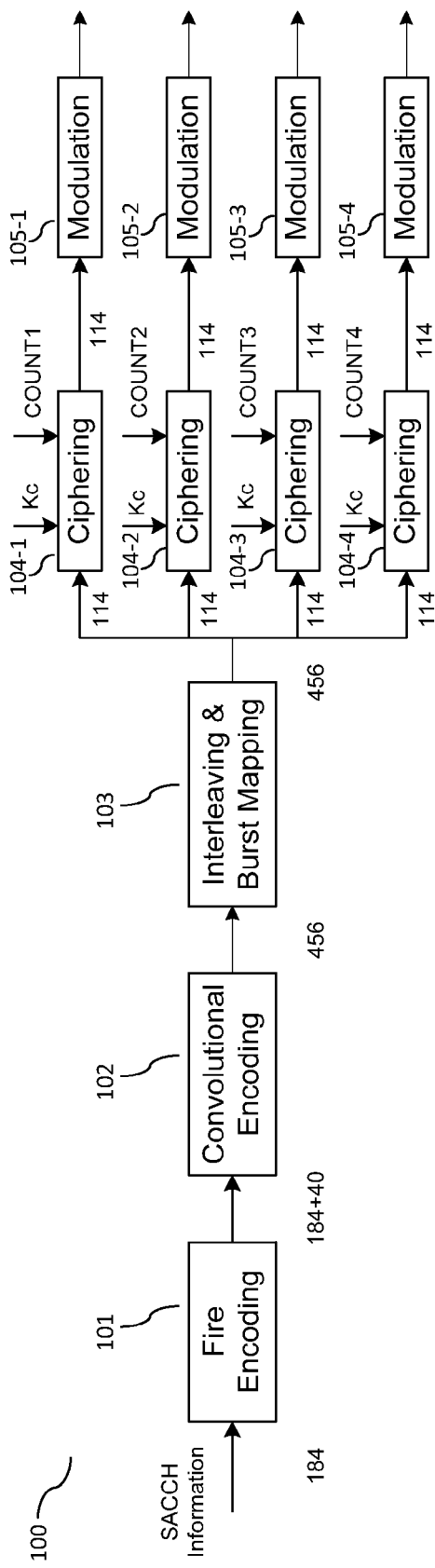

FIG. 1 shows an example block diagram 100 of GSM SACCH coding and modulation. The plaintext and ciphertext denote the text before and after the ciphering unit 104 at the transmitter, respectively. Kc is the GSM ciphering key and COUNT is the TDMA frame number of the SACCH frame.

FIG. 1 illustrates an example for a stream-ciphered SACCH in GSM. A SACCH block transmits or carries or contains 184 payload bits. In DL direction, SACCH transmits 16-bit (2-byte) layer 1 (L1) header information and 168-bit (21-byte) higher layer information. In general, the power control and timing advance information in the L1 header may vary (slowly) during a voice call and is therefore typically unknown, or unpredictable, for an attacker during a voice call. However, some higher layer (Layer 2 frame) (21 octets) information may be used to transmit system information such as SI5, SI6 which include location area identification, the BCCH frequencies of neighbour cells and a number of control parameters for the communications within the cell. This system information rarely changes after a call setup. Some of the information in SI5 and SI6 is also broadcast (in an unciphered manner) on the BCCH. This information is thus publicly known which also means that some of the SACCH plaintext may be known to an attacker, thereby enabling the use of known-plaintext attacks.

In uplink (UL) direction, SACCH transmits or carries or contains a measurement report in which the contents may vary SACCH block by SACCH block. In general, the plaintext in the UL of SACCH is unknown by an attacker, such that information on the UL typically cannot be used to perform known-plaintext attacks. Therefore, there is a particular need to enhance A5/1 ciphering on the SACCH downlink transmission. The methods and systems outlined in the present document may be applied to SACCH encoding/decoding on the DL and, optionally, to the SACCH encoding/decoding on the UL.

SACCH coding and interleaving are specified in 3GPP TS 45.003, GERAN (Channel coding), which is incorporated by reference, and are illustrated in FIG. 1. The 184 SACCH payload bits are first encoded by the Fire encoder 101 (e.g. through the use of cyclic redundancy check (CRC) in a systematic format, i.e., 184 payload bits are unchanged and are appended with 40 parity check bits). These encoded bits, together with 4 terminating bits, are input to a convolutional encoder 102, e.g. a half rate non-systematic non-recursive convolutional encoder, which outputs 456 coded bits. These 456 coded bits are then interleaved, and burst mapping assigns 114 coded bits (plaintext) of the 456 coded bits to each of four bursts (performed by the interleaving & Burst Mapping unit 103). Each of the four bursts is ciphered in a respective ciphering unit 104-1, 104-2, 104-3, 104-4 (briefly referred to by reference numeral 104). The ciphering units 104 may perform A5/1 ciphering (or other A5 ciphering algorithms) as will be outlined in the following. That is, the four bursts may be ciphered by modulo-2 addition with a 114-bit cipher block for a given TDMA frame, in order to generate the 114-bit ciphertext at the output of the ciphering units 104. The ciphertext may then be modulated in modulation units 105-1, 105-2, 105-3, 105-4 for transmission to a corresponding receiver.

Figure 2:
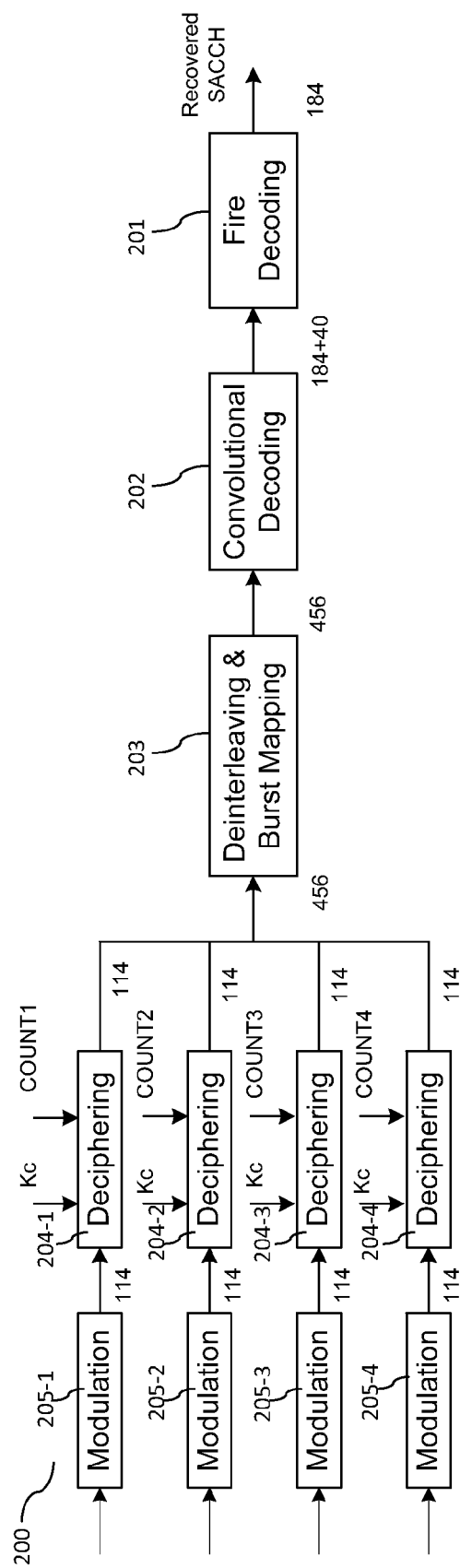
FIG. 2 illustrates an example block diagram of a SACCH decoding chain (including the respective number of bits of SACCH data)

A corresponding example SACCH decoding procedure 200 is illustrated in FIG. 2. The four blocks of 114-bit ciphertext are demodulated in demodulation units 205-1, 205-2, 205-3, 205-4 and then passed to the deciphering units 204-1, 204-2, 204-3, 204-4 which apply the same GSM ciphering key Kc and COUNT as the corresponding ciphering units 104-1, 104-2, 104-3, 104-4 at the transmitter, thereby providing the four bursts of plaintext. The four bursts are de-mapped and de-interleaved (unit 203) to provide 456 coded bits. Subsequently, convolutional decoding (reference numeral 202) and Fire decoding (reference numeral 201) are performed to provide the recovered 184 SACCH bits of a SACCH information block.

Figures 5, 6:
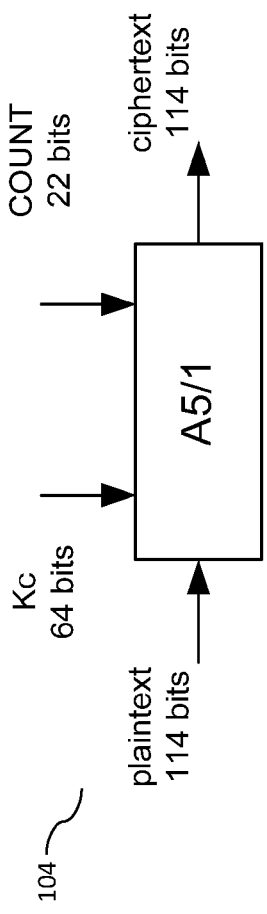
FIG. 5 shows an example GSM 26-multiframe structure (FR)
FIG. 6 shows an example A5/1 ciphering unit.

In GSM, a SACCH information block is transmitted every 480 ms over 4 GSM 26-multiframes 500 as shown in FIG. 5 for the full-rate scenario ("T" indicates TDMA frames for TCH; "A" indicates a TDMA frame for SACCH and "I" indicates an idle TDMA frame). As can be seen in FIG. 1, a SACCH information block is mapped onto four bursts (each of which is transmitted through a TDMA frame). FIG. 5 illustrates the GSM channel organization of full-rate TCH 502 and SACCH 501. There are 12 consecutive TCH frames 502 allocated before each SACCH frame 501, which implies that before the transmission of each SACCH frame 501, there are 12 consecutive ciphered TCH frames 502 that potentially have been transmitted. The cipher blocks which are used to cipher the bursts in the TCH frames 502 are generated by the A5/1 algorithm using the same ciphering key Kc as used for ciphering the bursts in the SACCH frames 501, but using different TDMA frame numbers.

In the following further details regarding the A5/1 ciphering algorithm will be provided. As already indicated above A5/1 ciphering is a stream cipher used in GSM to implement text ciphering for each burst (with a typical burst length of 114 bits) in form of $$c_j = p_j \oplus e_j, \text{ for } j=1, 2, \ldots, 114$$

where $p_j$, $c_j$ and $e_j$ represent plaintext, ciphertext and cipher block digits, respectively, and where $\oplus$ denotes the XOR operation (i.e. a bitwise modulo-2 addition). As shown in FIG. 1, ciphering (within ciphering unit 104) takes place before modulation (within modulation unit 105) and after burst mapping (within mapping & interleaving unit 103) at the transmitter (see 3GPP TS 45.001, GERAN; Physical layer on the radio path—general description, which is incorporated by reference). As shown in FIG. 2, deciphering 204 takes place symmetrically after demodulation (within demodulation unit 205) at the receiver. The decrypted digits $p'_j$ are recovered by applying the same cipher block $e_j$ used at the transmitter to the demodulated digits $c'_j$, i.e., $$p'_j = e_j \oplus c'_j, \text{ for } j=1, 2, \ldots, 114.$$

In A5/1 ciphering, for each burst (i.e. each 4.615 ms) a cipher block $e_j$ of 228 bits is generated based on an irregular clocking of three linear feedback shift registers (LFSRs) and based on the initial state of the shift registers, wherein the initial state is a linear combination of the ciphering key $K_C$ (size of 64 bits) and the publicly known frame counter COUNT (representing the TDMA frame number), wherein the size of the frame counter COUNT is 22 bits. Each of the 228 cipher block bits is generated by conducting modulo-2 additions at the outputs of the three LFSRs. Among the 228 bits in the cipher block, the first block of 114 bits are used for the downlink (DL) and the second block including the rest of 114 bits in the cipher block are used for the uplink (UL) (as specified in 3GPP TS 43.020; Security related network functions, which is incorporated by reference).

The three LFSRs 1110, 1120, 1130 which may be used to generate a cipher block are illustrated in FIG. 11 which shows a possible implementation of the A5/1 algorithm 1100. As outlined above, the A5/1 algorithm 1100 is initialized using the 64-bit ciphering key Kc together with the publicly-known 22-bit frame number COUNT (of the TDMA frame which is to be ciphered). The three LFSRs 1110, 1120, 1130 use irregular clocking and are specified as follows:

TABLE 1

| LFSR reference | Length in bits | Feedback polynomial | Clocking bit | Tapped bits |
|---|---|---|---|---|
| 1110 | 19 | $x^{19} + x^{18} + x^{17} + x^{14} + 1$ | 8 | 13, 16, 17, 18 |
| 1120 | 22 | $x^{22} + x^{21} + 1$ | 10 | 20, 21 |
| 1130 | 23 | $x^{23} + x^{22} + x^{21} + x^8 + 1$ | 10 | 7, 20, 21, 22 |

The three LSFRs 1110, 1120, 1130 are indexed with the least significant bits (LSB) 1111, 1121, 1131 as 0. The three registers are clocked in a "stop and go" fashion using a majority rule which is applied to the clocking bits 1112, 1122, 1132 of the three LSFRs. At each cycle, the clocking bit 1112, 1122, 1132 of all three registers 1110, 1120, 1130 is examined and the majority bit is determined. A register is clocked if the clocking bit 1112, 1122, 1132 agrees with the majority bit. Hence at each step two or three registers are clocked.

The feedback mechanism is implemented using respective XOR operators 1114, 1124, 1134 which combine the feedback from the respective feedback bits 1113, 1123, 1133 of the three LSFRs.

Initially, the registers are set to zero. Then for 64 cycles, the 64-bit ciphering key Kc is mixed into the LSFRs according to the following scheme: in the $i^{th}$ cycle ($i=0, \ldots, 63$), the $i^{th}$ bit of the ciphering key Kc is added to the least significant bit of each register using an XOR operation. Then, each register is clocked. In a similar manner, the 22-bits of the frame number COUNT are added to the LSFRs in 22 cycles. Subsequently, the entire system is clocked for a certain number of cycles (e.g. 100 cycles) using the normal majority clocking mechanism, wherein the output of the three LSFRs is discarded. After this is completed, the A5/1 algorithm 1100 is ready to produce the two 114-bit sequences of the two cipher blocks, the first 114 bits for the downlink, and the last 114 bits for the uplink. This is done by combining the output of the LSRFs 1110, 1120, 1130 using an XOR operator 1140.

Figure 3:
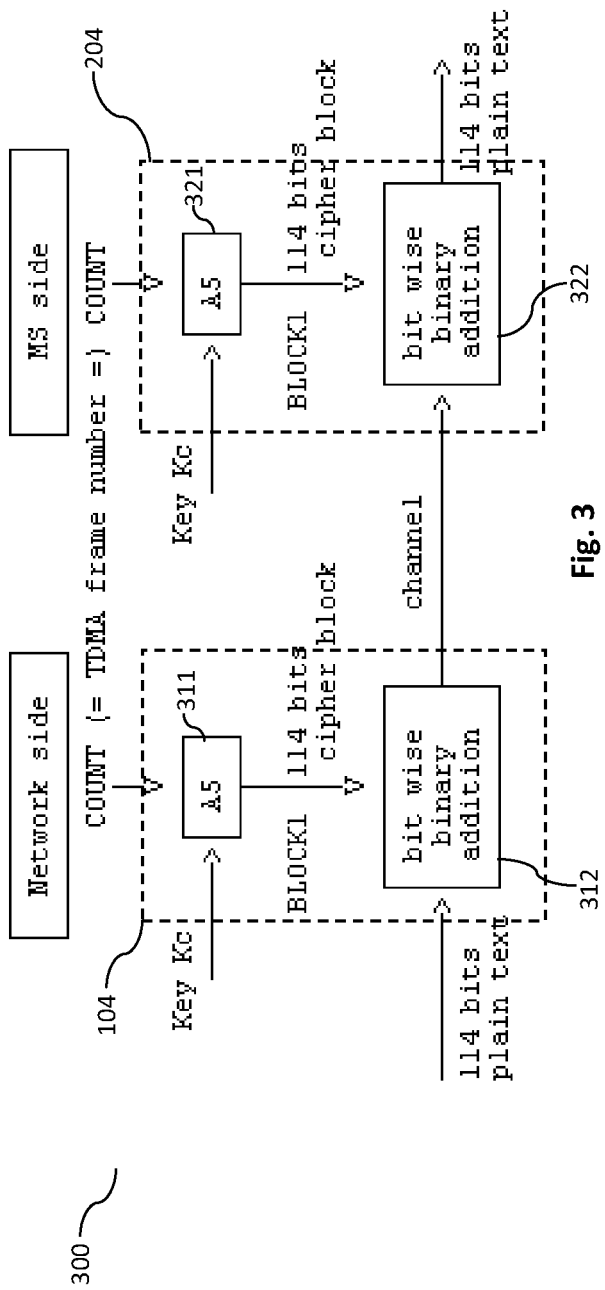
FIG. 3 shows an example ciphering unit using an A5 ciphering algorithm on the downlink (DL) in GSM (Global System for Mobile Communications)

FIG. 3 illustrates an example for A5 ciphering/deciphering 300 in DL direction. In particular, FIG. 3 illustrates the ciphering unit 104 at a transmitter (on the network side) and the deciphering unit 204 at a receiver (on the MS side). Both units 104, 204 comprise corresponding cipher block determination units 311, 321, which derive corresponding cipher blocks for the ciphering and the deciphering, respectively. The cipher blocks are derived from the ciphering key Kc and the frame counter COUNT (as described above). Typically, the cipher block determination units 311, 321 are identical and provide identical cipher blocks at the transmitter and at the receiver. Furthermore, the ciphering unit 104 and the deciphering unit 204 comprise respective ciphertext determination units 312, 322 which apply the above mentioned XOR operation in order to convert plaintext to ciphertext in a burst.

As specified in 3GPP TS 43.020, (Security related network functions), the setting of the A5/1 ciphering key Kc may be triggered by the authentication procedure of a MS. The transmission of the ciphering key Kc from the network to the MS is typically indirect and may make use of the authentication RAND value. In this case, the ciphering key Kc is derived from the RAND value (size of the RAND value is 128 bits) by using the algorithm A8 and the Subscriber Authentication key Ki (size of Ki is 128 bits). The ciphering key Kc (size of the ciphering key is 64 bits) is stored (on SIM or USIM) by the mobile station until it is updated, e.g. at the next authentication.

Figure 4:
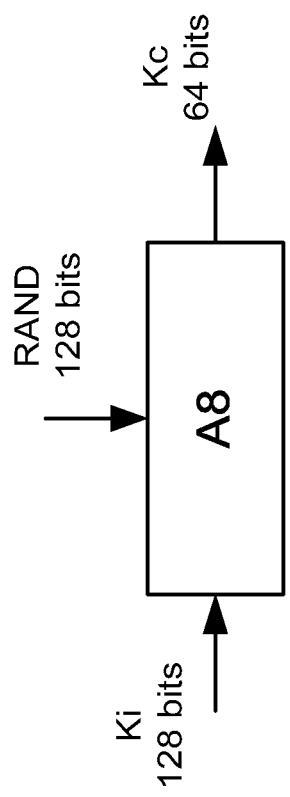
FIG. 4 illustrates an example generation unit of an A5/1 ciphering key Kc using the A8 algorithm.

FIG. 4 illustrates the generation of the A5/1 ciphering key Kc using the A8 algorithm. The authentication parameter RAND is a non-predictable number which is transmitted from the base station subsystem of the network to the MS during the authentication process for generation of the signature SRES and the ciphering key Kc (this is illustrated in detail in 3GPP TS 43.020, Security related network functions, and 3GPP TS 24.008; Mobile radio interface Layer 3 specification; Core network protocols, which are incorporated by reference).

FIG. 3 illustrates a possible implementation of the ciphering unit 104 which comprises a dedicated cipher block determination unit 311. The output of cipher block determination unit 311 is a cipher block and the inputs of the cipher block determination unit 311 are the TDMA frame number COUNT and the ciphering key Kc. If a cipher block in the ciphering unit 104 can be extracted directly as the output of the cipher block determination unit 311 (as shown in FIG. 3), the cipher block can be stored for further processing (e.g. for using the cipher block to determine a pseudo-random bit block, as will be outlined below). It should be noted that the ciphering unit 104 may also be referred to as an encryption unit in the present context.

Another implementation of the ciphering or encryption unit 104 is illustrated in FIG. 6. If the encryption unit 104 is implemented as presented in FIG. 6, a cipher block cannot be extracted directly. Nevertheless, a cipher block for a TCH frame (or a SACCH frame) at the network side (i.e. at the transmitter side) can be easily obtained by conducting binary additions of plaintext and ciphertext (thereby yielding the cipher block). A cipher block for a TCH frame (or the SACCH frame) at the MS side (i.e. at the receiver side) can be obtained by applying a predefined plaintext, as well as the ciphering key Kc and the TDMA frame count COUNT used in the network for a given TDMA frame number as the inputs to the encryption unit 104. Then the cipher block can be deducted from the output ciphertext of the encryption unit 104 and the input plaintext to the encryption unit 104. The determined cipher block may be used for the generation of a pseudo-random bit block, as will be outlined below.

As such, the encryption/ciphering (e.g. using the A5/1 algorithm) of data in GSM has been described. The encrypted/ciphered data may be subject to cipher attacks. In general, there are two common types of attack on A5/1 encryption, a Known-ciphertext attack and a Known-plaintext attack.

In general, brute force search is required for a known-ciphertext-attack. Although an A5/1 ciphering key Kc has 64 bits, the complexity of exhaustive search may be reduced to $O(2^{54})$ instead of $O(2^{64})$, if a ciphering key Kc which has the 10 least significant bits fixed to zeros is used. The ciphertext may be known by an attacker. In GSM, an attacker can typically obtain the ciphertext by using the known unciphered training sequence to estimate the channel and by further conducting equalization/demodulation. As such, an attacker may determine the ciphertext which is exchanged between a network and a MS.

If the corresponding plaintext is unknown (e.g., in the cases where an SMS (Short message service) or measurement report is transmitted on SACCH or where speech data is transmitted on TCH), the attacker can use the brute force attack by trying every possible ciphering key Kc among $2^{54}$ values and by conducting the full decoding process during each trial. The fire decoder 201 shown in FIG. 2 may be used to detect whether or not a trail on the ciphering key Kc is successful.

The computational complexity for an attack can be significantly reduced if the attacker has full knowledge of both the encrypted text (i.e. the ciphertext) and the plaintext (Known-plaintext attack). In this case, the attacker may deduce the cipher block which has been used to encrypt the plaintext, and hence the attacker may deduce the ciphering key Kc of the A5/1 algorithm. The attack is based on the assumption that the attacker is able to detect some (or all) cipher block bits from a sequence of TDMA frames, thereby providing a sequence of cipher block bits. With the given sequence of cipher block bits, the attacker may recover the initial state of the shift registers (LFSRs) and further determine the secret ciphering key Kc of the A5/1 algorithm. It has been reported that the complexity of known-plaintext attacks on A5/1 ciphering can be reduced to) $O(2^{40})$ to $O(2^{45})$ or even less with time-memory tradeoffs making real-time cryptanalysis of A5/1 ciphering practically possible.

Since in GSM both SI2 (unciphered on BCCH) and SI5 (ciphered on SACCH) may transmit the same Neighbour Cell Description IE, an attacker can compare some of the known plaintext, for example related to SI2, with the known ciphertext, for example related to SI5, in order to acquire a sequence of cipher block bits and further to figure out the ciphering key Kc and to decrypt the remaining parts of a conversation of a GSM user. The same weaknesses could be exploited with SI2bis and SI5bis, or with SI2ter and SI5ter. As such, by exploiting the availability of plaintext, a known-plaintext attack may be performed as outlined above.

Since an A5/1 ciphering key Kc is 64-bits (effectively 54 bits) long and the cipher block bits are the linear combination of the outputs of three LSFRs 1110, 1120, 1130, A5/1 ciphering is vulnerable to the known-plaintext attack. Several attacks on A5/1 ciphering have been described, which reduce the complexity of the search given the assumption that both plaintext and ciphertext are known by an attacker. Consequently, as a result of the availability of plaintext information (within the BCCH), which (partially) corresponds to ciphertext information (within the SACCH), GSM (e.g. using the A5/1 ciphering algorithm) may be subject to the relatively low complexity known-plaintext attack, thereby reducing the security of data exchange via a GSM network.

The present document addresses this security problem by randomizing the input data stream of the A5/1 ciphering unit 104, in order to "hide" the plaintext input to the ciphering unit 104. By "hiding" the plaintext input at the ciphering unit 104 within a random data stream, an attacker is forced to perform a ciphertext-only attack, instead of a less complex known-plaintext attack. In other words, by randomizing the plaintext input to the ciphering unit 104 the complexity of an attack on the ciphering of GSM (e.g. the A5/1 ciphering), based on exploiting information redundancy on the SACCH, can be significantly increased, up to the to limits of a brute force search.

The proposed randomization scheme makes use of a randomizer/de-randomizer pair at an encoder and at a decoder, respectively. The randomizer/de-randomizer pair may make use of a pseudo-random bit block in order to randomize bits at the encoder, and in order to correspondingly de-randomize the bits at the decoder. The randomizer/de-randomizer pair may rely on encryption or ciphering information which is already available at the encoder and at the decoder. In particular, the randomizer/de-randomizer pair may rely on the ciphering key Kc, in order to randomize the plaintext input to the ciphering unit 104 and correspondingly de-randomize the output of the deciphering unit 204.

By way of example, a pseudo-random bit block for randomization/de-randomization may be generated from the same ciphering key Kc than the cipher block for a SACCH frame, but from a different TDMA frame number COUNT. In this case, one or more cipher blocks (pseudo-random bits) that were generated for previously transmitted bursts (using a different COUNT value) may be used to randomize the input data (plaintext) of the A5/1 ciphering unit 104. Randomization may be performed by a binary addition of the plaintext and the pseudo-random bit sequence (pseudo-random bit block).

As shown in FIG. 3, a cipher block of A5/1 ciphering is a function of the ciphering key Kc and the TDMA frame number COUNT of the respective frame. Although the ciphering key Kc used for the encryption of a TCH frame 502 of FIG. 5 is the same as the ciphering key Kc used for the encryption of a SACCH frame 501 of FIG. 5, since TCH and SACCH are transmitted on different TDMA frames, the cipher blocks for TCH frames 502 and SACCH frames 501 are different. Unlike the cipher blocks for a SACCH frame 501, the cipher blocks for the TCH frames 502 cannot be deducted by an attacker in a straightforward way due to the unknown plaintext (i.e. encoded speech data) carried by the TCH frames 502. This means that the cipher blocks for TCH frames 502, which are transmitted before a SACCH frame 501 in a 26-frame multiframe 500 may be used to generate a reliable pseudo-random bit block for randomizing data of the SACCH information block prior to entering the ciphering unit 104. Alternatively or in addition, variants of these cipher blocks used for one or more preceding TCH frames 502 can be considered to generate some or all of the pseudo-random bits for randomization.

Figure 7:
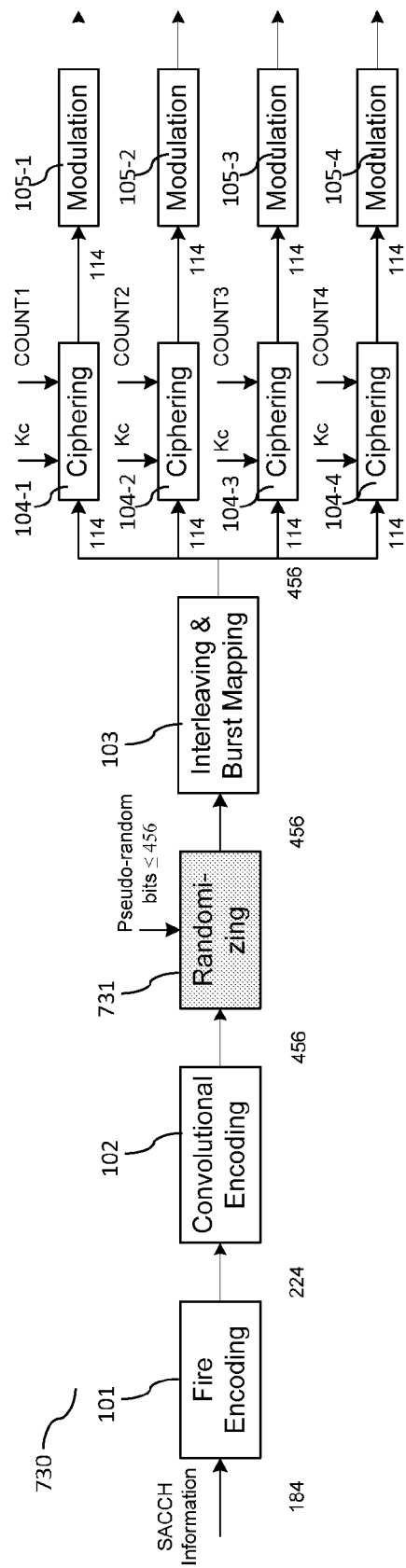
Figure 7:
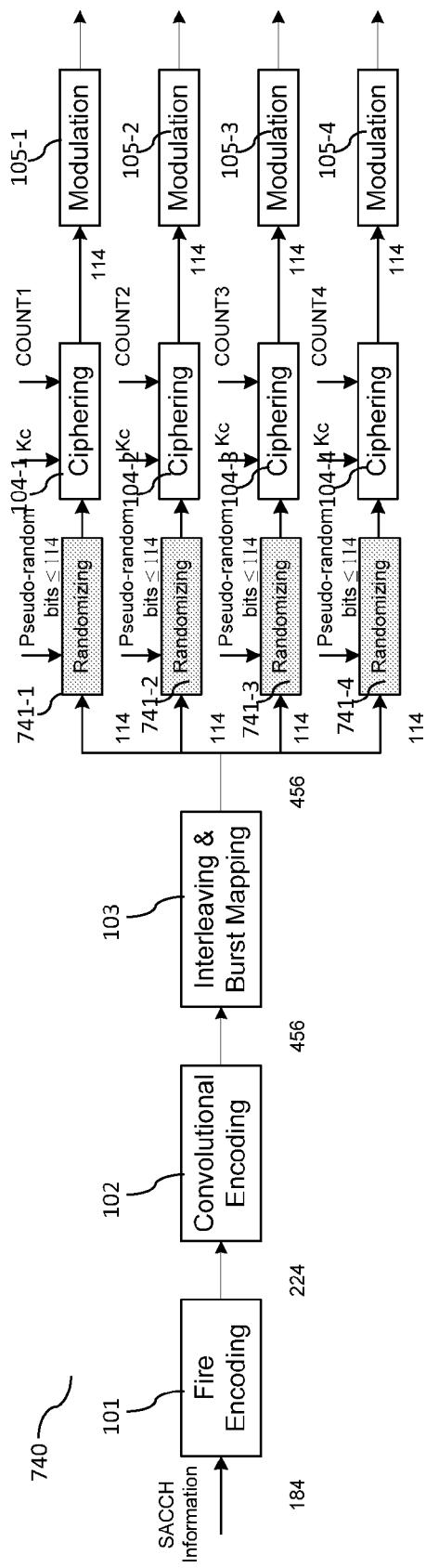

These pseudo-random bits are unknown to an attacker, but they are known by both, the transmitter and the receiver. This means that randomization and the corresponding de-randomization can be performed without the need to exchange any additional information between the transmitter and the receiver. Various examples of the process of randomization of SACCH data are shown in FIGS. 7 a, b, c, and d, and the corresponding receiver architectures are shown in FIGS. 8 a, b, c, and d.

It can be seen that the randomization of the SACCH information may be performed at any position upstream of the ciphering unit 104, i.e. prior to the generation of the ciphertext burst. By way of example, the initial SACCH information block (comprising 184 bits) (or parts thereof) may be randomized in randomization block 711 (see scenario 710). In this case, a pseudo-random bit block of up to 184-bits lengths may be used to randomize the information block (or parts thereof). This means that some or all of the bits of the SACCH information block may be randomized. Alternatively or in addition, the fire encoded SACCH information block (comprising 224 bits) (or parts thereof) may be randomized in randomization block 721 (see scenario 720). In this case, a pseudo-random bit block of up to 224-bits lengths may be used to randomize the fire encoded SACCH information block. This means that some or all of the bits of the fire encoded SACCH information block may be randomized. Alternatively or in addition, the convolutional encoded and fire encoded SACCH information block (comprising 456 bits) may be randomized in randomization block 731 (see scenario 730). In this case, a pseudo-random bit block of up to 456-bits lengths may be used to randomize the convolutional encoded and fire encoded SACCH information block. This means that some or all of the bits of the convolutional encoded and fire encoded SACCH information block may be randomized Alternatively or in addition, the bursts (comprising 114 bits) at the input of the ciphering unit 104 may be randomized in randomization block 741 (see scenario 740). In this case, a pseudo-random bit block of up to 114-bits lengths may be used to randomize the bursts at the input of the ciphering unit 104. This means that some or all of the bits of the bursts at the input of the ciphering unit 104 may be randomized. In general, the number of bits within the pseudo-random bit block should be equal to the number of bits that is to be randomized.

As indicated above, it is possible to use a pseudo-random bit block which comprises less bits than the input to the randomization block 711, 721, 731, 741. By way of example, the pseudo-random bit block may comprise only half of the number of bits at the input to the randomization block 711, 721, 731, 741. In this case, only a fraction of the bits at the input to the randomization block 711, 721, 731, 741 may be randomized, e.g. a fraction corresponding to the length of the pseudo-random bit block. Alternatively or in addition, particular bits of the pseudo-random bit block may be used several times to randomize all of the bits at the input to the randomization block 711, 721, 731, 741. Alternatively or in addition, a randomization function other than the modulo-2 addition or XOR operation may be used to randomize the input bits to the randomization block 711, 721, 731, 741.

Figure 8:
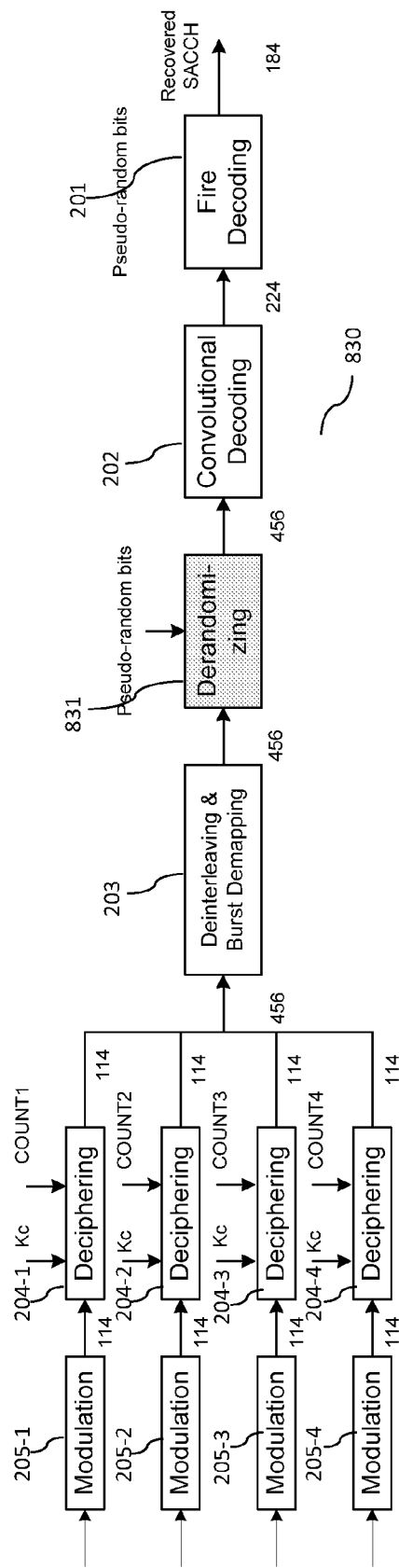
Figure 8:
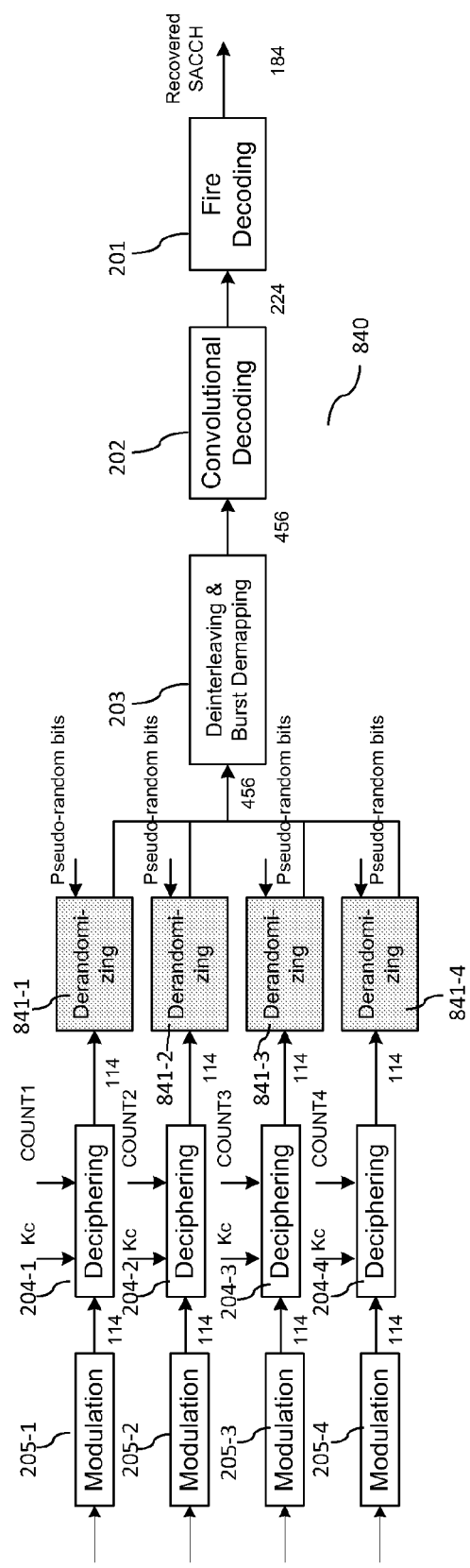

As shown in FIGS. 8 a, b, c and d, the de-randomization may be performed in a corresponding manner downstream of the fire decoder 201 in randomization unit 811 (see scenario 810), downstream of the convolutional decoder 202 and upstream of the fire decoder 201 in randomization unit 821 (see scenario 820), downstream of the de-interleaving and de-mapping unit 203 and upstream of the convolutional decoder 202 in randomization unit 831 (see scenario 830), and/or downstream of the deciphering unit 204 and upstream of the de-interleaving and de-mapping unit 203 in randomization unit 841 (see scenario 840).

As shown in FIG. 5, for full rate (FR) operation in each 26-frame multiframe, there are 12 TDMA frames for TCH which are transmitted prior to the TDMA frame for SACCH. The cipher blocks for these TCH frames within a multiframe preceding the SACCH frame may be denoted $E_{t1}, E_{t2}, \ldots, E_{t12}$. These cipher blocks are available to provide pseudo-random bits which may be used to randomize the bits within the following SACCH frame in the multiframe. In other words, the cipher bocks of the TCH frames preceding the SACCH frame may be used to determine a pseudo-random bit block for the randomization of the bits within the SACCH frame.

A set of pseudo-random bits generated from one or multiple cipher blocks for the preceding TCH frames may be denoted as $E_r$. The set of pseudo-random bits $E_r$ may be derived from the one or more cipher blocks of preceding TCH frames using linear and/or non-linear operations, thereby providing a set of bits from which the pseudo-random bit block $E_s$ for SACCH randomization can be derived. In the randomizing function 711, 721, 731, 741, a bit block at the input of the units 711, 721, 731, 741 can be randomized by way of binary addition of the pseudo-random bit block $E_s$ to the bit block at the input, thereby yielding a randomized bit block.

As already indicated above, the A5/1 algorithm makes use of three LFSRs 1110, 1120, 1130, the ciphering key Kc and the frame counter COUNT to generate a pair of cipher blocks (a respective cipher block of the pair being used for the DL and the UL, respectively). The initial state of each LFSR (Linear feedback shift register) in the A5/1 algorithm is a linear function of Kc and COUNT. As such, each cipher block $E_{ti}$, $i=1, \ldots, 12$, for ciphering a TCH frame preceding a SACCH frame is a linear function of Kc and the respective frame number COUNT of the TCH frame. A set of pseudo-random bits $E_r$ can be obtained by processing one or more of these previously generated cipher block(s). Some examples for determining a set of pseudo-random bits $E_r$ from one or more of the preceding cipher blocks $E_{ti}$ are outlined below. The methods may be used alone or in combination, in order to provide a set of pseudo-random bits $E_r$ from which the pseudo-random bit block $E_s$ may be selected. By way of example, the pseudo-random bit block $E_s$ may be selected to be equal to the set of pseudo-random bits $E_r$.

(1) Non-Linear Combining of Cipher Blocks $E_{ti}$

Let two cipher blocks be $E_{tk}=\{e_{tk,1}, e_{tk,2}, \ldots, e_{tk,114}\}$ and $E_{tl}=\{e_{tl,1}, e_{tl,2}, \ldots, e_{tl,114}\}$ $1, k=1, \ldots, 12$, 1 unequal to k. A possible non-linear combination of $E_{tk}$ and $E_{tl}$ may be derived as $E_r=\{e_{tk,1} \cdot e_{tl,1}, e_{tk,2} \cdot e_{tl,1}, \ldots, e_{tk,114} \cdot e_{tl,114}\}$, i.e. by multiplying respective bits of the cipher blocks.

(2) Interleaving or Transposing a Cipher Block

Let $\pi$ be a predefined interleaving algorithm. A set of pseudo-random bits may be obtained from one or more cipher blocks as $E_r=\pi(E_{ti})$.

(3) Circular Shifting a Cipher Block

Define a sequence $X=\{x_1, x_2, \ldots, x_n\}$ and define a circular shift function with shifting m position as $C_m$, i.e. $Y=C_m(X)=\{x_{n-m+1}, x_{n-m+2}, \ldots, x_n, x_1, \ldots, x_{n-m}\}$. Let a cipher block be $E_{ti}=\{e_{ti,1}, e_{ti,2}, \ldots, e_{ti,114}\}$, then $E_r=C_m(E_{ti})$.

Alternatively or in addition, the pseudo-random bit block $E_s$ may be generated from a variant of the ciphering key Kc. A new or modified ciphering key Kc' may be derived from the current ciphering key Kc, in order to generate a pseudo-random bit block $E_s$ which is then used to randomize the SACCH bits prior to entering the A5/1 ciphering unit 104. In other words, a modified ciphering key Kc' may be determined from the ciphering key Kc. The modified ciphering key Kc' and a frame number COUNT (e.g. the frame number of the SACCH frame which is to be randomized) is used to initialized the LSFRs 1110, 1120, 1130 of the A5/1 algorithm 1100 shown in FIG. 11. As a result, a set of pseudo-random bits $E_r$ may be determined from which a pseudo-random bit block $E_s$ of a particular length may be selected.

The function to derive Kc' from Kc may be predefined (e.g. standardized) so that the modified ciphering key Kc' can be determined independently on the transmitter and on the receiver. As such, the ciphering key Kc' is a variant of Kc, with Kc'=F(Kc). Examples of the function F( ) include interleaving, transposing, and/or circular shifting, etc. I.e. the modified ciphering key Kc' can be determined from the ciphering key Kc using a linear or non-linear function F( ). A pseudo-random bit block $E_s$ which is generated using Kc' and COUNT is different from the cipher block generated using Kc and COUNT. The pseudo-random bit block $E_s$ is unknown by an attacker and may be used to randomize the SACCH information for improved security, i.e. the cipher block generated using Kc' can be used as a pseudo-random bit block $E_s$ for randomization of the bits of a SACCH frame.

An example block diagram 1200 of a method for determining the pseudo-random bit block $E_s$ is illustrated in FIG. 12. The pseudo-random bit block $E_s$ may be determined in the pseudo-random bit block determination unit 1204 from one or more sets of pseudo-random bits $E_{tk}$ and/or $E_x$. As outlined above, the pseudo-random bit block determination unit 1204 may apply one or more mathematical functions on the one or more sets of pseudo-random bits $E_{tk}$ and/or $E_x$ to determine the pseudo-random bit block $E_s$. The one or more mathematical functions may comprise the combining of the plurality of sets of pseudo-random bits $E_{tk}$ and/or $E_x$ by a non-linear mathematical function, the interleaving or transposing of the one or more sets of pseudo-random bits $E_{tk}$ and/or $E_x$, and/or the circular shifting of the one or more sets of pseudo-random bits $E_{tk}$ and/or $E_x$.

The one or more sets of pseudo-random bits $E_{tk}$ may be determined within a first pseudo-random bit determination unit 1202. In particular, the one or more sets of pseudo-random bits $E_{tk}$ may correspond to one or more cipher blocks used to cipher one or more data bursts preceding the SACCH frame. As such, the first pseudo-random bit determination unit 1202 may make use of the ciphering key Kc and the frame numbers $COUNT_1, \ldots, COUNT_{12}$ of the traffic bursts preceding the SACCH burst, in order to generate one or more cipher blocks $E_{tk}$. In particular, the first pseudo-random bit determination unit 1202 may make use of an A5 to ciphering algorithm 1100 as illustrated in FIG. 11.

Alternatively or in addition, a set of pseudo-random bits $E_x$ may be determined within a second pseudo-random bit determination unit 1203. It should be noted that the pseudo-random bit block $E_s$ may be determined from the set of pseudo-random bits $E_x$ alone, from the one or more sets of pseudo-random bits $E_{tk}$ alone, or from a combination of the sets $E_x$ and $E_{tk}$. In particular, the pseudo-random bit block $E_s$ may be selected to be equal to the set of pseudo-random bits $E_x$.

The second pseudo-random bit determination unit 1203 for generating the set of pseudo-random bits $E_x$ may make use of a modified ciphering key Kc' and the frame count number COUNT of the SACCH frame. In particular, the second pseudo-random bit determination unit 1203 may make use of an A5 ciphering algorithm 1100 as illustrated in FIG. 11. The modified ciphering key Kc' may be determined from the ciphering key Kc within the ciphering key modification unit 1201. As outlined above, the ciphering key modification unit 1201 may make use of a modification function. The modification function may comprise e.g. one or more of interleaving of bits comprised in the ciphering key Kc, transposing of bits comprised in the ciphering key Kc, and/or circular shifting of the bits comprised in the ciphering key Kc.

If the randomization 741 is applied to the plaintext of a SACCH burst prior to entering the ciphering unit 104 and if within the randomization unit 741, the pseudo-random bit block $E_s$ is binary added to the plain text of the SACCH burst, the proposed method of randomization using a pseudo-random bit block $E_s$ determined from the modified ciphering key Kc' can be interpreted as an additional ciphering step with a different (modified) ciphering key Kc', prior to the legacy ciphering 104 using the ciphering key Kc. This is illustrated in FIG. 9, where the plaintext of a SACCH burst after Interleaving/Burst Mapping 103 is ciphered twice using the modified key Kc' (within the additional ciphering unit 901) and using the ciphering key Kc (within the legacy ciphering unit 104). Consequently, the proposed scheme may be referred to as "double ciphering". The corresponding receiver showing an additional deciphering unit 1001 is illustrated in FIG. 10. The TDMA frame numbers COUNT1', COUNT2', COUNT3' and COUNT4' used for the additional ciphering unit 901 may be the same as the TDMA frame numbers COUNT1, COUNT2, COUNT3 and COUNT4 used for the legacy ciphering unit 104. The same may apply to the TDMA frame numbers used at the corresponding additional deciphering unit 1001 and the legacy deciphering unit 204. Alternatively, the TDMA frame numbers COUNT1', COUNT2', COUNT3' and COUNT4' may differ from the TDMA frame numbers COUNT1, COUNT2, COUNT3 and COUNT4, e.g. the TDMA frame numbers COUNT1', COUNT2', COUNT3' and COUNT4' may correspond to the frame numbers of a TCH frame preceding the respective SACCH frame with the TDMA frame number COUNT1, COUNT2, COUNT3 or COUNT4, respectively.

In the above mentioned randomization (or double ciphering) schemes, the SACCH information (or bits derived from the SACCH information) is randomized using a pseudo-random bit block $E_s$. The pseudo-random bit block may be determined using the cipher block(s) of one or more previously transmitted frames and/or pseudo-random bits which are generated by a variant of the ciphering key Kc. As a consequence of the additional randomization, a known plaintext attack will fail, because an attacker cannot (easily) determine the bits of a burst entering the ciphering unit 104. This means that an attacker has to perform a known ciphertext-only attack. Therefore, the computational complexity for performing an attack on SACCH frames which are submitted to randomization is substantially equal to the brute force search, i.e. $O(2^{54})$. In other words, by performing the additional randomization as described in the present document, the same degree of security strength can be achieved on both, the SACCH and the TCH. This is particularly the case, if a non-linear function is used to generate a pseudo-random bit block from the cipher block(s) of one or more previously transmitted frame(s) and/or if a non-linear function is used to determine a modified ciphering key Kc' from the ciphering key Kc. That is, by using non-linear functions to derive a pseudo-random bit block for the randomization of the SACCH information bits, the complexity for an attack can be further increased.

Furthermore, even though a pseudo-random bit block $E_s$ is generated from the cipher blocks of previously transmitted frames and/or from a variant of the cipher key Kc, i.e. Kc', which is different from the ciphering key Kc, the pseudo-random bit block $E_s$ can be determined from already available information, independently at the transmitter and at the receiver. This means that no additional information needs to be exchanged between the transmitter and the receiver. The function between the pseudo-random bit block $E_s$ and the already available information (e.g. the one or more preceding cipher blocks, the ciphering key Kc, the TDMA frame number) may be pre-defined and known at the transmitter and the receiver. In addition, the function may be non-linear, thereby increasing the computational complexity for determining the pseudo-random bit block in the context of an attack. Alternatively or in addition, the function may be kept secret, thereby preventing any kind of possibilities for a known-plaintext attack.

As shown in FIGS. 7 to 10, the proposed methods and systems for increasing the security of SACCH transmission involve an additional step of randomization. The legacy steps/components for Fire encoding 101, convolutional encoding 102, interleaving/burst mapping 103 and the legacy ciphering 104 remain unchanged. As such, the proposed methods and systems can be readily integrated into existing GSM networks by adding corresponding randomization/de-randomization units at the transmitter and at the receiver. The additional operations in randomization units involve the generation and/or acquisition of a pseudo-random bit block and the subsequent application of the pseudo-random bit block to the SACCH data (using a certain number (e.g. 114) of modulo-2 additions).

In order to enable a mobile station (MS) to inform a base station/network of its capability to perform the additional randomization of SACCH data, an additional bit in MS Classmark 3 may be used to indicate the new capability. Furthermore, the Assignment command, the Cipher mode command, and/or the DTM Assignment command may be modified to enable/disable the additional randomization of SACCH data described in the present document.

In the present document, methods and systems for increasing the security of the transmission of SACCH frames in GSM networks have been described. The described methods and systems make use of an additional randomization of the SACCH data, in order to impede or prevent the possibility of known-plaintext attacks. For performing the additional randomization, a pseudo-random bit block is determined from one or more cipher blocks used for previously transmitted frames and/or from the ciphering key Kc using a pre-defined function. As a result of the additional randomization, the computational complexity for performing an attack is increased (up to the complexity of a brute force attack). This is particularly the case, when using a non-linear function for determining the pseudo-random bit block.

The described security schemes are particularly robust. The proposed randomization of plaintext may randomize the SACCH plaintext in a SACCH block or burst with a pseudo-random bit block which is unknown by an attacker. This means that a ciphertext attack is required. The computational complexity is up to $O(2^{54})$, i.e. the complexity of a brute force attack. Therefore, when using the proposed "randomization of plaintext" scheme, the security strength of SACCH is the same as the security strength of TCH. Furthermore, the proposed randomization scheme does not require GSM networks to update any SACCH payload content, i.e. the SACCH payload content remains unchanged. In addition, the proposed scheme can typically be implemented in Layer 1 with low computational effort. By way of example, the implementation of the proposed randomization scheme could comprise the generation of a pseudo-random bit block (which could be reduced to 114 modulo-2 additions among plaintext and ciphertext at the transmitter) and additional 114 modulo-2 additions of binary sequences at the transmitter and at the receiver. It may not be necessary to generate a new pseudo-random bit block for each burst. A pseudo-random bit block can be generated once and remain unchanged as long as Kc is unchanged. This simplifies the implementation, i.e., the implementation complexity of the additional randomization process described in this application comprises only the to generation of one pseudo-random bit block for a plurality of bursts and 114 modulo-2 additions for each burst. Additional storage may be used to store the pseudo-random bit block. On the other hand, the legacy operations of channel coding, interleaving and ciphering remain unchanged, and the hardware for implementing the A5/1 ciphering algorithm is not impacted.

Finally, it should be noted that the proposed randomization scheme is applicable to SACCH operation in Shifted SACCH operation, as well as in both Full Rate and Half Rate channels.

The methods and systems described in the present document may be implemented as software, firmware and/or hardware. Certain components may e.g. be implemented as software running on a digital signal processor or microprocessor. Other components may e.g. be implemented as hardware or as application specific integrated circuits. The signals encountered in the described methods and systems may be stored on media such as random access memory or optical storage media. They may be transferred via networks, such as radio networks, satellite networks or wireless networks. Typical devices making use of the methods and systems described in the present document are mobile stations such as mobile telephones or smartphones. On the network side, the methods and systems may be used in base station equipment.

A possible implementation of the above mentioned randomization scheme in the context of 3GPP (3$^{rd}$ Generation Partnership Project) may involve modifications to the following technical specifications (TS) of 3GPP: TS 24.008, TS 43.020, and/or TS 44.018. These technical specifications are incorporated by reference in their valid version, as of the date of filing of the present patent application.

By way of example, the "Randomization of Plaintext" method described in the present document could be defined in the context of TS 44.018 (e.g. Section 2.1.2) as: "Randomization of Plaintext for SACCH, when ciphering is started between the network and the mobile station: the mechanism used by the network in downlink to randomize the plain text of SACCH using randomizing bits (i.e. a pseudo-random bit block) and accordingly the ability of the mobile station to de-randomize the plaintext of SACCH."

Furthermore, the "Randomization of Plaintext for SACCH" method may be defined within Section 3.4.7 of TS 44.018 as: Randomization of Plaintext for SACCH, when ciphering is started between the network and the mobile station in dedicated mode or dual-transfer mode, refers to the mechanism used by the network in downlink to randomize the plain text of SACCH using randomizing bits and accordingly the ability of the mobile station to de-randomize the plaintext of SACCH. The use of Randomization of Plaintext for SACCH is typically under control of the network. It may be indicated with the Randomization of Plaintext for SACCH IE (information element) sent in the CIPHERING MODE COMMAND, ASSIGNMENT COMMAND, HANDOVER COMMAND and DTM ASSIGNMENT COMMAND messages. The network may use Randomization of Plaintext for SACCH only if supported by the mobile station, as indicated in the MS Classmark 3 IE (see 3GPP TS 24.008).

In order to initiate the channel assignment procedure, a GSM network typically sends an ASSIGNMENT COMMAND message to the mobile station (see Section 3.4.3.1 of TS 44.018). The ASSIGNMENT COMMAND message may comprise a Randomization of Plaintext for SACCH IE. In that case Randomization of Plaintext for SACCH shall be applied on the new channel as indicated in this IE. If no such information is present, the use of Randomization of Plaintext for SACCH is the same as on the previous channel. The ASSIGNMENT COMMAND message shall not contain a Randomization of Plaintext for SACCH IE unless it contains a cipher mode setting IE that indicates "start ciphering" as described above: if such an ASSIGNMENT COMMAND message is received it shall be regarded as erroneous, an ASSIGNMENT FAILURE with cause "Protocol error unspecified" message shall be returned immediately, and no further action shall be taken. The ASSIGNMENT COMMAND message is defined in Table 9.1.2.1 of TS 44.018. The Table may be extended by the following line:

| IEI | Information element | Type/Reference | Presence | Format | length |
|---|---|---|---|---|---|
| F- | Randomization of Plaintext for SACCH | Randomization of Plaintext for SACCH (See new section 10.5.2.9a) | O | TV | 1 |

If the SACCH information element is omitted in the ASSIGNMENT COMMAND message, the use of Randomization of Plaintext for SACCH is not changed after the mobile station has switched to the assigned channel. This information element shall not be included if support for this IE has not been indicated by the mobile station in the Mobile Station Classmark 3 IE (see 3GPP TS 24.008).

The network initiates the handover procedure by sending a HANDOVER COMMAND message to the mobile station (see Section 3.4.4.1 of TS 44.018). The HANDOVER COMMAND message may comprise an optional indication, by the Randomization of Plaintext for SACCH IE, whether or not to use Randomization of Plaintext for SACCH if a cipher mode setting IE is also included that indicates "start ciphering" and a CIPHERING MODE COMMAND message has been transmitted previously in this instance of the dedicated mode or ciphering has been started earlier in UTRAN. If a Randomization of Plaintext for SACCH IE is included and a cipher mode setting IE is missing or is included but does not indicate "start ciphering", the HANDOVER COMMAND message shall be regarded as erroneous, a HANDOVER FAILURE message with cause "Protocol error unspecified" shall be returned immediately, and no further action shall be taken. The HANDOVER COMMAND message content is defined in Table 9.1.15.1 of TS 44.018. The Table may be extended by the above mentioned line.

If the SACCH information element is omitted in the HANDOVER COMMAND message, the use of Randomization of Plaintext for SACCH is not changed after the mobile station has switched to the assigned channel. This information element shall not be included if support for this IE has not been indicated by the mobile station in the Mobile Station Classmark 3 IE (see 3GPP TS 24.008).

The network initiates the ciphering mode setting procedure by sending a CIPHERING MODE COMMAND message to the mobile station (see Section 3.4.7.1 of TS 44.018). The CIPHERING MODE COMMAND message indicates whether ciphering shall be used or not, and if yes which algorithm to use, and optionally whether Randomization of Plaintext for SACCH shall be used or not, as indicated by the Randomization of Plaintext for SACCH IE. The CIPHERING MODE COMMAND message content is defined in Table 9.1.9.1 of TS 44.018. The Table may be extended by the above mentioned line.

On receipt of a DTM REQUEST message the network may allocate an uplink packet resource. The packet uplink resource is assigned to the mobile station in one of the DTM assignment messages: DTM ASSIGNMENT COMMAND or PACKET ASSIGNMENT (see Section 3.4.22.1.1.3.1 of TS 44.018). The DTM ASSIGNMENT COMMAND message may comprise a Randomization of Plaintext for SACCH IE. In that case, Randomization of Plaintext for SACCH shall be applied on the new channel as indicated in this IE. If no such information is present, the use of Randomization of Plaintext for SACCH is the same as on the previous channel. The DTM ASSIGNMENT COMMAND message shall not comprise a Randomization of Plaintext for SACCH IE unless it comprises a cipher mode setting IE that indicates "start ciphering" as described above. If such a DTM ASSIGNMENT COMMAND message is received it shall be regarded as erroneous, a DTM ASSIGNMENT FAILURE with cause "Protocol error unspecified" message shall be returned immediately, and no further action shall be taken. The DTM ASSIGNMENT COMMAND message content is defined in Table 9.1.12e.1 of TS 44.018. The Table may be extended by the above mentioned line.

If the SACCH information element is omitted in the DTM ASSIGNMENT COMMAND message, the use of Randomization of Plaintext for SACCH is not changed after the mobile station has switched to the assigned channel. This information element shall not be included if support for this IE has not been indicated by the mobile station in the Mobile Station Classmark 3 IE (see 3GPP TS 24.008).

The new Randomization of Plaintext for SACCH IE may be defined in a new Section 10.5.2.9a of the TS 44.018 as follows: The Randomization of Plaintext for SACCH information element is used by the network to indicate to the mobile station whether Randomization of plaintext is used on SACCH, when ciphering is started between the network and the mobile station. The Randomization of Plaintext for SACCH information element may be coded as shown in Figure 10.5.2.9a.1 and Table 10.5.2.9a.1 of TS 44.018. The Randomization of Plaintext for SACCH is a type 1 information element.

| FIG. 10.5.2.9a.1: Randomization of Plaintext for SACCH information element | | | | | | | |
|---|---|---|---|---|---|---|---|
| 8 | 7 | 6 | 5 | 4 | 3 | 2 | 1 |
| | | | | 0 | 0 | 0 | |
| Randomization of Plaintext for SACCH IEI | | | | spare | | RPS | Octet 1 |

TABLE 10.5.2.9a.1

Randomization of Plaintext for SACCH information element
RPS Randomization of Plaintext for SACCH (octet 1)

Bit
1

| 0 | Randomization of Plaintext for SACCH is not used |
| 1 | Randomization of Plaintext for SACCH is used |

As already indicated above, support for the IE should be indicated by the mobile station in the Mobile Station Classmark 3 IE (see 3GPP TS 24.008). For this purpose, Figure 10.5.7 of 3GPP TS 24.008 Mobile Station Classmark 3 information element may be extended by an additional bit (e.g. in the context of Release 10): <Randomization of Plaintext for SACCH: bit>. The additional bit may be defined as: Randomization of Plaintext for SACCH (1 bit field). This field indicates whether the mobile station supports Randomization of Plaintext for SACCH (see 3GPP TS 44.018). It may be coded as follows:

| | Bit |
|---|---|
| 0 | Randomization of Plaintext for SACCH not supported, |
| 1 | Randomization of Plaintext for SACCH supported. |

Furthermore, TS 43.020 may be modified to describe an embodiment of the methods outlined in the present document. Section 4.2 of TS 43.020 deals with the ciphering method used in a GSM network. The section may be extended by stating: For SACCH, before ciphering, the user data bits are randomized with randomization bits generated also from A5. Randomization of SACCH text before ciphering is specified in annex C.1.

The annex C.1 of TS 43.020 outlines the implementation of the A5 algorithm used in a GSM network. This section may be extended by stating: For ciphering on downlink SACCH, the randomization of plain text takes place before ciphering and after interleaving (shown in FIGS. 13 and 14); the de-randomization takes place after demodulation and before deciphering symmetrically. In ciphering on downlink SACCH, for each slot on the network side, before ciphering, a sequence of NPBB (Number of Payload bits per burst) randomization bits (called BLOCK' in FIGS. 13 and 14 and referred to as pseudo random bit block in the present document) is combined by a bit-wise modulo 2 addition with the NPBB-bit plain text block. The first random bit p0 in BLOCK' is added to e0 to generate e0', the second p1 to e1 to generate e1' and so on. The resulting randomized NPBB-bit block is then applied to A5 ciphering which is combined with NPBB encipher/decipher bits in BLOCK by a bit-wise modulo 2 additions, i.e., the first encipher/decipher bit is added to e0', the second to e1' and so on. The resulting NPBB-bit block is then applied to the burst builder as described in annex C.1 of TS 43.020.

In deciphering on downlink SACCH, for each slot on MS side, after deciphering the MS uses the same sequence of pseudo-random bits BLOCK' for de-randomization by bit-wise modulo 2 additions (as shown in FIGS. 13 and 14).

FIG. 13 illustrates the implementation of the randomization/de-randomization of plaintext and enciphering/deciphering procedure for downlink SACCH for the GMSK (Gaussian Minimum Shift Keying) case where NPBB is equal to 114. For generation of randomization bits, the same ciphering key Kc is used. On both the network and MS sides, a previous TDMA frame number is derived from the current SACCH COUNT by COUNT–J (J is an integer value greater zero, e.g. J=2). The coding of COUNT–J is the same as shown in Figure C.1 of TS 43.020. The cipher block generated by Kc and COUNT–J, {pi}, i=0, 1, . . . , NPBB−1, may be further circular-shifted N (N<NPBB) positions, i.e., {pi}, i=N, (N+1) mod NPBB, . . . , (NPBB−1+N) mod NPBB.

FIG. 14 illustrates the implementation of the randomization/de-randomization of plaintext and enciphering/deciphering procedure for downlink SACCH for the GMSK case where NPBB is equal to 114. To generate randomization bits, on both the network and MS sides, a different ciphering key Kc' is derived from the ciphering key Kc by circular-shifting the ciphering key block by N positions.

Particular aspects of the present document are

Aspect 1) A method for encoding a SACCH information block in a wireless network, the method comprising
  randomizing a plurality of randomization unit input, R-INPUT, bits derived from at least some of a plurality of payload bits of the SACCH information block using a pseudo-random bit block, thereby yielding a plurality of randomized bits; wherein the pseudo-random bit block is determined based on at least a ciphering key Kc; and ciphering a plurality of ciphering unit input, C-INPUT, bits derived from at least some of the plurality of randomized bits, thereby yielding an encoded data burst of a SACCH frame; wherein ciphering is based on a ciphering algorithm, e.g. an A5 ciphering algorithm, using the ciphering key Kc and a frame number COUNT of the SACCH frame.

Aspect 2) The method of aspect 1, wherein the plurality of R-INPUT bits are any one of
some or all of the plurality of payload bits of the SACCH information block; or
some or all of a plurality of fire encoded bits; wherein the plurality of fire encoded bits is determined by fire encoding (101) the plurality of payload bits of the SACCH information block; or
some or all of a plurality of convolutional encoded bits; wherein the plurality of convolutional encoded bits is determined by submitting the plurality of fire encoded bits to a convolutional encoder (102); or
some or all of a plurality of plaintext bits of a data burst; wherein the plurality of plaintext bits of the data burst is determined by mapping a subset of the plurality of convolutional encoded bits to the data burst.

Aspect 3) The method of aspects 2, further comprising
fire encoding the plurality of payload bits of the SACCH information block or, if the plurality of R-INPUT bits are some or all of the plurality of payload bits of the SACCH information block, fire encoding the plurality of randomized bits; and/or
convolutional encoding the plurality of fire encoded bits or, if the plurality of R-INPUT bits are some or all of the plurality of fire encoded bits, convolutional encoding the plurality of randomized bits; and/or
interleaving and mapping the plurality of convolutional encoded bits or, if the plurality of R-INPUT bits are some or all of the plurality of convolutional encoded bits, interleaving and mapping the plurality of randomized bits.

Aspect 4) The method of any of aspects 2 to 3, wherein
the plurality of payload bits of the SACCH information block comprises 184 bits; and/or
the plurality of fire encoded bits comprises 224 bits; and/or
the plurality of convolutional encoded bits comprises 456 bits; and/or
the plurality of plaintext bits of the data burst comprises 114 bits.

Aspect 5) The method of any previous aspect, wherein randomizing a plurality of R-INPUT bits using a pseudo-random bit block comprises performing a bitwise modulo-2 addition of the plurality of R-INPUT bits and the pseudo-random bit block.

Aspect 6) A method for decoding a SACCH information block in a wireless network from an encoded data burst of a SACCH frame, the method comprising
deciphering a plurality of bits comprised within the encoded data burst of the SACCH frame, thereby yielding a plurality of recovered plaintext bits of a data burst; wherein deciphering is based on a ciphering algorithm, e.g. an A5 ciphering algorithm, using a ciphering key Kc and a frame number COUNT of the SACCH frame; and
de-randomizing a plurality of de-randomization unit input, D-INPUT, bits derived from at least some of the plurality of plaintext bits of the data burst using a pseudo-random bit block; wherein the pseudo-random bit block is determined based on the ciphering key Kc.

Aspect 7) The method of aspect 6, wherein the plurality of D-INPUT bits is any of
some or all of the plurality of recovered plaintext bits of the data burst; or
some or all of a plurality of recovered convolutional encoded bits; wherein the plurality of recovered convolutional encoded bits is determined by combining the plurality of plaintext bits of a plurality of data bursts; or
some or all of a plurality of recovered fire encoded bits; wherein the plurality of recovered fire encoded bits is determined by submitting the plurality of recovered convolutional encoded bits to a convolutional decoder (202); or
some or all of the plurality of recovered payload bits of the SACCH information block; wherein the plurality of recovered payload bits is determined by submitting the plurality of recovered fire encoded bits to a fire decoder (201).

Aspect 8) The method of aspect 7, further comprising
de-interleaving and de-mapping the plurality of recovered plaintext bits of a plurality of data bursts or, if the plurality of D-INPUT bits is some or all of the plurality of recovered plaintext bits for the data bursts, de-interleaving and de-mapping the plurality of de-randomized D-INPUT bits from the plurality of data bursts; and/or
convolutional decoding the plurality of recovered convolutional encoded bits or, if the plurality of D-INPUT bits is some or all of the plurality of recovered convolutional encoded bits, convolutional decoding the plurality of de-randomized D-INPUT bits; and/or
fire decoding the plurality of recovered fire encoded bits or, if the plurality of D-INPUT bits is some or all of the plurality of recovered fire encoded bits, fire decoding the plurality of de-randomized D-INPUT bits.

Aspect 9) The method of any of aspects 7 to 8, wherein
the plurality of recovered payload bits of the SACCH information block comprises 184 bits; and/or
the plurality of recovered fire encoded bits comprises 224 bits; and/or
the plurality of recovered convolutional encoded bits comprises 456 bits; and/or
the plurality of recovered plaintext bits of the data burst comprises 114 bits.

Aspect 10) The method of any of aspects 6 to 9, wherein de-randomizing a plurality of D-INPUT bits using a pseudo-random bit block comprises performing a bitwise modulo-2 addition of the plurality of D-INPUT bits and the pseudo-random bit block.

Aspect 11) The method of any previous aspect, wherein the pseudo-random bit block is determined from information common to a transmitter of the SACCH frame and a receiver of the SACCH frame.

Aspect 12) The method of any previous aspect, wherein the pseudo-random bit block is determined by one or more cipher blocks generated by a ciphering algorithm using the ciphering key Kc and/or other parameters required by the ciphering algorithm.

Aspect 13) The method of aspect 12, wherein the ciphering algorithm for determining the pseudo-random bit block is an A5 ciphering algorithm, e.g. the A5/1 ciphering algorithm.

Aspect 14) The method of any previous aspect, wherein different pseudo-random bit blocks are used for different SACCH frames.

Aspect 15) The method of any of aspects 1 to 13, wherein a common pseudo-random bit block is used for a plurality of SACCH frames.

Aspect 16) The method of any previous aspect, further comprising
determining the pseudo-random bit block using a second frame number which is different from the frame number COUNT of the SACCH frame.

Aspect 17) The method of aspect 16, wherein the second frame number is a frame number of a TCH frame preceding the SACCH frame.

Aspect 18) The method of aspect 17, wherein the pseudo-random bit block is determined based on one or more A5 cipher blocks used to cipher one or more speech data bursts of corresponding TCH frames preceding the SACCH frame.

Aspect 19) The method of aspect 18, wherein the pseudo-random bit block is determined by one or more of
if the pseudo-random bit block is determined based on a plurality of cipher blocks, combining the plurality of cipher blocks by a mathematical function (e.g., a non-linear function);
interleaving or transposing of the one or more cipher blocks; and
circular shifting of the one or more cipher blocks.

Aspect 20) The method of any previous aspect, further comprising
determining a modified ciphering key Kc' from the ciphering key Kc using a modification function; and
determining the pseudo-random bit block using the modified ciphering key Kc'.

Aspect 21) The method of aspect 20, wherein the modification function comprises one or more of
interleaving of bits comprised in the ciphering key Kc;
transposing of bits comprised in the ciphering key Kc; and
circular shifting of the bits comprised in the ciphering key Kc.

Aspect 22) The method of any of aspects 20 to 21, referring back to any of aspects 1 to 15, wherein the pseudo-random bit block is determined using the A5 ciphering algorithm, the modified ciphering key Kc' and the frame number COUNT of the SACCH frame.

Aspect 23) An encoder (710, 720, 730, 740, 900) configured to encode a SACCH information block in a wireless network, the encoder (710, 720, 730, 740, 900) comprising
a randomization unit (711, 721, 731, 741, 901) configured to randomize a plurality of randomization unit input, R-INPUT, bits derived from at least some of a plurality of payload bits of the SACCH information block using a pseudo-random bit block, thereby yielding a plurality of randomized bits; and
a ciphering unit (104) configured to cipher a plurality of ciphering unit input, C-INPUT, bits derived from at least some of the plurality of randomized bits, thereby yielding an encoded data burst of a SACCH frame; wherein ciphering is based on an A5 ciphering algorithm using a ciphering key Kc and a frame number COUNT of the SACCH frame; wherein the pseudo-random bit block is determined based on the ciphering key Kc.

Aspect 24) A decoder (810, 820, 830, 840, 1000) configured to decode a SACCH information block in a wireless network from an encoded data burst of a SACCH frame, the decoder (810, 820, 830, 840, 1000) comprising
a deciphering unit (204) configured to decipher a plurality of bits comprised within the encoded data burst of the SACCH frame, thereby yielding a plurality of recovered plaintext bits of a data burst; wherein deciphering is based on an A5 ciphering algorithm using a ciphering key Kc and a frame number COUNT of the SACCH frame; and
a de-randomization unit (811, 821, 831, 841, 1001) configured to de-randomize a plurality of de-randomization unit input, D-INPUT, bits derived from at least some of the plurality of recovered plaintext bits of the data burst using a pseudo-random bit block; wherein the pseudo-random bit block is determined based on the ciphering key Kc.

Aspect 25) An encoded data burst of a SACCH frame in a GSM network, wherein the encoded data burst has been generated using the method of any of aspects 1 to 5 or of aspects 11 to 22 referring back to any of aspects 1 to 5.

Aspect 26) A software program adapted for execution on a processor and for performing the method of either one of aspects 1 to 22 when carried out on a computing device.

Aspect 27) A storage and/or computer readable medium comprising a software program adapted for execution on a processor and for performing the method of either one of aspects 1 to 22 when carried out on a computing device.

Aspect 28) A computer program product comprising executable instructions for performing the method of either one of aspects 1 to 22 when executed on a computer.

What is claimed is:

1. A method for encoding a Slow Associated Control Channel, SACCH, information block in a wireless network, the method comprising:
randomizing a plurality of randomization unit input, R-INPUT, bits derived from at least some of a plurality of payload bits of the SACCH information block using a pseudo-random bit block, thereby yielding a plurality of randomized bits; wherein the pseudo-random bit block is determined based on at least a ciphering key Kc;
ciphering a plurality of ciphering unit input, C-INPUT, bits derived from the at least some of the plurality of randomized bits, thereby yielding an encoded data burst of a SACCH frame; wherein ciphering is based on a ciphering algorithm using the ciphering key Kc and a frame number COUNT of the SACCH frame; and
determining the pseudo-random bit block using a second frame number which is different from the frame number COUNT of the SACCH frame, wherein the second frame number is a frame number of a Traffic Channels (TCH) frame preceding the SACCH frame.

2. The method of claim 1, wherein the plurality of R-INPUT bits are any one or more of:
some or all of the plurality of payload bits of the SACCH information block;
some or all of a plurality of fire encoded bits; wherein the plurality of fire encoded bits is determined by fire encoding the plurality of payload bits of the SACCH information block;
some or all of a plurality of convolutional encoded bits; wherein the plurality of convolutional encoded bits is determined by submitting the plurality of fire encoded bits to a convolutional encoder; and
some or all of a plurality of plaintext bits of a data burst; wherein the plurality of plaintext bits of the data burst is determined by mapping a subset of the plurality of convolutional encoded bits to the data burst.

3. The method of claim 1, wherein randomizing a plurality of R-INPUT bits using a pseudo-random bit block comprises performing a bitwise modulo-2 addition of the plurality of R-INPUT bits and the pseudo-random bit block.

4. A method for decoding a Slow Associated Control Channel, SACCH, information block in a wireless network from an encoded data burst of a SACCH frame, the method comprising:

deciphering a plurality of bits comprised within the encoded data burst of the SACCH frame, thereby yielding a plurality of recovered plaintext bits of a data burst; wherein deciphering is based on a ciphering algorithm using a ciphering key Kc and a frame number COUNT of the SACCH frame; and de-randomizing a plurality of de-randomization unit input, D-INPUT, bits derived from at least some of the plurality of plaintext bits of the data burst using a pseudo-random bit block; wherein the pseudo-random bit block is determined based on the ciphering key Kc and the pseudo-random bit block is determined using a second frame number which is different from the frame number COUNT of the SACCH frame, wherein the second frame number is a frame number of a Traffic Channels (TCH) frame preceding the SACCH frame.

5. The method of claim 4, wherein the plurality of D-INPUT bits is any one or more of:

some or all of the plurality of recovered plaintext bits of the data burst;

some or all of a plurality of recovered convolutional encoded bits; wherein the plurality of recovered convolutional encoded bits is determined by combining the plurality of plaintext bits of a plurality of data bursts;

some or all of a plurality of recovered fire encoded bits; wherein the plurality of recovered fire encoded bits is determined by submitting the plurality of recovered convolutional encoded bits to a convolutional decoder; and some or all of the plurality of recovered payload bits of the SACCH information block; wherein the plurality of recovered payload bits is determined by submitting the plurality of recovered fire encoded bits to a fire decoder.

6. The method of claim 4, wherein de-randomizing a plurality of D-INPUT bits using a pseudo-random bit block comprises performing a bitwise modulo-2 addition of the plurality of D-INPUT bits and the pseudo-random bit block.

7. The method of claim 4, wherein the pseudo-random bit block is determined from information common to a transmitter of the SACCH frame and a receiver of the SACCH frame.

8. The method of claim 1, wherein the pseudo-random bit block is generated utilizing a ciphering algorithm using the ciphering key Kc and/or other parameters required by the ciphering algorithm.

9. The method of claim 8, wherein the ciphering algorithm for determining the pseudo-random bit block is an A5 ciphering algorithm.

10. The method of claim 1, wherein a-common pseudo-random bit block is used for a plurality of SACCH frames.

11. The method of claim 1, wherein the pseudo-random bit block is determined based on one or more A5 cipher blocks used to cipher one or more traffic bursts of corresponding TCH frames preceding the SACCH frame.

12. The method of claim 11, wherein the pseudo-random bit block is determined by one or more of:

if the pseudo-random bit block is determined based on a plurality of cipher blocks, combining the plurality of cipher blocks by a mathematical function;

interleaving or transposing of the one or more cipher blocks; and circular shifting of the one or more cipher blocks.

13. The method of claim 1, further comprising:

determining a modified ciphering key Kc' from the ciphering key Kc using a modification function; and determining the pseudo-random bit block using the modified ciphering key Kc'.

14. The method of claim 13, wherein the modification function comprises one or more of:

interleaving of bits comprised in the ciphering key Kc;
transposing of bits comprised in the ciphering key Kc; and
circular shifting of the bits comprised in the ciphering key Kc.

15. An encoder configured to encode a SACCH information block in a wireless network, the encoder comprising:

a randomization unit configured to randomize a plurality of randomization unit input, R-INPUT, bits derived from at least some of a plurality of payload bits of the SACCH information block using a pseudo-random bit block, thereby yielding a plurality of randomized bits; and a ciphering unit configured to cipher a plurality of ciphering unit input, C-INPUT, bits derived from at least some of the plurality of randomized bits, thereby yielding an encoded data burst of a SACCH frame; wherein ciphering is based on an A5 ciphering algorithm using a ciphering key Kc and a frame number COUNT of the SACCH frame; wherein the pseudo-random bit block is determined based on the ciphering key Kc, wherein the pseudo-random bit block is determined using a second frame number which is different from the frame number COUNT of the SACCH frame, wherein the second frame number is a frame number of a Traffic Channels (TCH) frame preceding the SACCH frame.

16. A decoder configured to decode a SACCH information block in a wireless network from an encoded data burst of a SACCH frame, the decoder comprising:

a deciphering unit configured to decipher a plurality of bits comprised within the encoded data burst of the SACCH frame, thereby yielding a plurality of recovered plaintext bits of a data burst; wherein deciphering is based on an A5 ciphering algorithm using a ciphering key Kc and a frame number COUNT of the SACCH frame; and a de-randomization unit configured to de-randomize a plurality of de-randomization unit input, D-INPUT, bits derived from at least some of the plurality of recovered plaintext bits of the data burst using a pseudo-random bit block; wherein the pseudo-random bit block is determined based on the ciphering key Kc, wherein the pseudo-random bit block is determined using a second frame number which is different from the frame number COUNT of the SACCH frame, wherein the second frame number is a frame number of a Traffic Channels (TCH) frame preceding the SACCH frame.

17. A non-transitory computer-readable medium encoded with instructions capable of being executed by a computer, wherein execution of the instructions capable of being executed by a computer is for:

randomizing a plurality of randomization unit input, R-INPUT, bits derived from at least some of a plurality of payload bits of a SACCH information block using a pseudo-random bit block, thereby yielding a plurality of randomized bits; and ciphering a plurality of ciphering unit input, C-INPUT, bits derived from at least some of the plurality of randomized bits, thereby yielding an encoded data burst of a SACCH frame; wherein ciphering is based on a ciphering algorithm using a ciphering key Kc and a frame number COUNT of the SACCH frame; wherein the pseudo-random bit block is determined based on the ciphering key Kc and wherein the pseudo-random bit block is determined using a second frame number which is different from the frame number COUNT of the SACCH frame, wherein the second frame number is a frame number of a Traffic Channels (TCH) frame preceding the SACCH frame.

18. A non-transitory computer-readable medium encoded with instructions capable of being executed by a computer, wherein execution of the instructions capable of being executed by a computer is for:

deciphering a plurality of bits comprised within an encoded data burst of a SACCH frame, thereby yielding a plurality of recovered plaintext bits of a data burst; wherein deciphering is based on a ciphering algorithm using a ciphering key Kc and a frame number COUNT of the SACCH frame; and de-randomizing a plurality of de-randomization unit input, D-INPUT, bits derived from at least some of the plurality of plaintext bits of the data burst using a pseudo-random bit block; wherein the pseudo-random bit block is determined based on the ciphering key Kc, wherein the pseudo-random bit block is determined using a second frame number which is different from the frame number COUNT of the SACCH frame, wherein the second frame number is a frame number of a Traffic Channels (TCH) frame preceding the SACCH frame.

* * * * *